US012566533B2

(12) United States Patent

Xu et al.

(10) Patent No.: US 12,566,533 B2

(45) Date of Patent: Mar. 3, 2026

(54) METHOD, APPARATUS, AND ELECTRONIC DEVICE FOR GENERATING A REMOTE CONTROL APPLICATION

(71) Applicant: Huawei Technologies Co., Ltd., Shenzhen (CN)

(72) Inventors: Shun Xu, Shanghai (CN); Min Huang, Shanghai (CN); Jianhai Lu, Shanghai (CN); Yupei Zhou, Shanghai (CN); Yalu Song, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 18/308,244

(22) Filed: Apr. 27, 2023

(65) Prior Publication Data

US 2023/0259250 A1 Aug. 17, 2023

Related U.S. Application Data

(63) Continuation of application No. PCT/CN2021/119707, filed on Sep. 22, 2021.

(30) Foreign Application Priority Data

Oct. 30, 2020 (CN) .......................... 202011193906.1

(51) Int. Cl.
*G06F 3/04817* (2022.01)
*G06F 3/04842* (2022.01)
(Continued)

(52) U.S. Cl.
CPC ...... *G06F 3/04817* (2013.01); *G06F 3/04842* (2013.01); *G06F 3/167* (2013.01);
(Continued)

(58) Field of Classification Search
CPC .. G06F 3/04817; G06F 3/04842; G06F 3/167; H04M 1/72415; H04M 1/72412;
(Continued)

(56) References Cited

U.S. PATENT DOCUMENTS 6,700,592 B1 * 3/2004 Kou .................... H04L 12/2814
715/733
7,865,829 B1 * 1/2011 Goldfield ............... G06Q 40/02
715/713
(Continued)

FOREIGN PATENT DOCUMENTS

CN 101237256 A 8/2008
CN 103970396 A 8/2014
(Continued)

OTHER PUBLICATIONS

UPnP Forum, UPnP Device Architecture 1.0 (Oct. 15, 2008), https://upnp.org/specs/arch/UPnP-arch-DeviceArchitecture-v1.0. pdf (Year: 2008).*

*Primary Examiner* — Justin R. Blaufeld
(74) *Attorney, Agent, or Firm* — WOMBLE BOND DICKINSON (US) LLP

(57) ABSTRACT

A control method and apparatus, and an electronic device are provided. In the method, an electronic device may obtain command information of an application on another electronic device, and generate a control application based on the command information. In this way, a user can start the control application to enable another electronic device to implement an action of the application. According to this method, the electronic device may implement a cross-device application control function through generating the control application, to implement multi-device collaboration and improve user experience.

20 Claims, 16 Drawing Sheets

(51) Int. Cl.

| | | |
|---|---|---|
| *G06F 3/16* | (2006.01) | |
| *G10L 15/22* | (2006.01) | |
| *H04L 12/28* | (2006.01) | |
| *H04N 21/422* | (2011.01) | |

(52) U.S. Cl.
CPC .......... *G10L 15/22* (2013.01); *H04L 12/2809* (2013.01); *H04L 12/281* (2013.01); *H04L 12/2814* (2013.01); *H04L 12/2816* (2013.01); *H04N 21/42225* (2013.01); *G10L 2015/223* (2013.01)

(58) Field of Classification Search
CPC ....... H04N 21/41265; H04N 21/42225; H04N 21/44227; H04N 21/4518; G10L 15/22; G10L 2015/223; H04L 12/2809; H04L 12/281; H04L 12/2814; H04L 12/2816
See application file for complete search history.

(56) References Cited

U.S. PATENT DOCUMENTS

| | | | | |
|---|---|---|---|---|
| 8,832,681 | B1* | 9/2014 | Cantrell .................... | G06F 8/61 717/172 |
| 9,454,251 | B1* | 9/2016 | Guihot ................... | G08C 17/00 |
| 11,087,659 | B2* | 8/2021 | Stroffolino ............... | G09G 3/20 |
| 2002/0027569 | A1* | 3/2002 | Manni ................... | G06F 3/0481 715/764 |
| 2008/0127170 | A1* | 5/2008 | Goldman ................. | G06F 8/61 717/174 |
| 2010/0013998 | A1* | 1/2010 | Mortensen ....... | H04N 21/41265 348/558 |
| 2010/0138007 | A1* | 6/2010 | Clark ................. | H04L 12/2809 715/771 |
| 2010/0169755 | A1* | 7/2010 | Zafar .................... | G06Q 10/00 715/205 |
| 2011/0086631 | A1* | 4/2011 | Park ................ | H04N 21/42203 704/270 |
| 2011/0239145 | A1 | 9/2011 | Kim | |
| 2012/0005577 | A1* | 1/2012 | Chakra ..................... | G06F 8/38 715/702 |
| 2012/0173767 | A1* | 7/2012 | Kim ...................... | H04L 12/282 710/11 |
| 2012/0198099 | A1* | 8/2012 | Kwon .............. | H04M 1/72406 710/16 |
| 2012/0281149 | A1* | 11/2012 | Mori .................. | H04N 21/8173 348/734 |
| 2013/0152135 | A1* | 6/2013 | Hong ................... | H04N 21/485 725/51 |
| 2013/0179928 | A1* | 7/2013 | Nagata ............ | H04N 21/41265 725/81 |
| 2013/0325460 | A1* | 12/2013 | Kim ........................ | G06F 3/167 704/231 |
| 2013/0337873 | A1* | 12/2013 | Yang .................. | H04M 1/0266 455/566 |
| 2014/0022192 | A1* | 1/2014 | Hatanaka ......... | H04N 21/42204 345/173 |
| 2015/0188724 | A1* | 7/2015 | Kim ...................... | H04N 7/181 340/3.71 |
| 2015/0358176 | A1* | 12/2015 | Hibara ................... | H05B 47/11 700/90 |
| 2016/0094702 | A1* | 3/2016 | Ariel ................ | H04M 1/72415 455/420 |
| 2017/0279632 | A1* | 9/2017 | Kober .................... | D06F 34/05 |
| 2018/0198905 | A1* | 7/2018 | Choi ....................... | A63F 13/42 |
| 2018/0204569 | A1* | 7/2018 | Nadkar .................. | G06F 3/167 |
| 2018/0210711 | A1* | 7/2018 | Roman ................. | G06F 8/20 |
| 2018/0270442 | A1* | 9/2018 | Park ...................... | G06F 3/0482 |
| 2019/0149871 | A1* | 5/2019 | Yoshizawa .......... | H04N 21/436 348/734 |
| 2019/0312746 | A1* | 10/2019 | Myers, III ......... | H04L 12/2807 |
| 2020/0204854 | A1* | 6/2020 | Song ................... | H04N 21/439 |

FOREIGN PATENT DOCUMENTS

| | | |
|---|---|---|
| CN | 108600853 A | 9/2018 |
| CN | 110381195 A | 10/2019 |
| JP | 2013198085 A | 9/2013 |

* cited by examiner

Tablet
computer

Smartphone

Communication
network

Wearable device

Notebook
computer

Smart television

Smart speaker

Control application generating procedure

Control application starting procedure

Smartphone (Turn on the smart television) Start the badminton motion sensing game application on the smart television

TO FIG. 7B

Start the local motion control application

TO FIG. 7B

Smartphone

TO

TO

Start the local
microphone
application

Smartphone

Microphone application on the smartphone (Turn on the smart television) Start the Huawei Video application on the smart television

TO (Turn on the smart speaker)

TO

Smartphone

1000

1100

METHOD, APPARATUS, AND ELECTRONIC DEVICE FOR GENERATING A REMOTE CONTROL APPLICATION

CROSS-REFERENCE TO RELATED APPLICATIONS

This application is a continuation of International Application No. PCT/CN2021/119707, filed on Sep. 22, 2021, which claims priority to Chinese Patent Application No. 202011193906.1, filed on Oct. 30, 2020. The disclosures of the aforementioned applications are hereby incorporated by reference in their entireties.

TECHNICAL FIELD

This application relates to the field of electronic device technologies, and in particular, to a control method and apparatus, and an electronic device.

BACKGROUND

With popularization of various types of electronic devices in all scenarios, multi-device collaboration becomes a development trend. However, currently, to implement multi-device collaboration, a user needs to separately perform an operation on each electronic device in multi-device collaboration. This process is complex, the operation is complex, and user experience is poor.

SUMMARY

This application provides a control method and apparatus, and an electronic device, to implement a cross-device application control function.

In some embodiments, this application provides a control method. The method may be applied to various application scenarios in which a plurality of electronic devices can communicate. The following uses a first electronic device as an example to describe operations in the method. The method includes:

The first electronic device obtains command information of a first application, and then generates a control application based on the command information of the first application. The first application is on a second electronic device. The command information of the first application is used to implement an action of the first application. The control application is used to enable the second electronic device to implement the action of the first application. For example, the command information of the first application may be an intent of the first application.

In this method, the first electronic device may generate a control application based on command information of an application on another electronic device. In this way, a user can start the control application to enable another electronic device to implement an action of the application. Apparently, based on this method, the electronic device may implement a cross-device application control function through generating the control application, to implement multi-device collaboration and improve user experience.

In some embodiments, the first electronic device may obtain the command information of the first application in the following manners:

Manner 1: Receive the command information of the first application from the second electronic device.

Manner 2: Obtain the command information that is of the first application and that is input by a user.

Based on the method, the first electronic device may flexibly obtain, in a plurality of manners, the command information of the application on another electronic device.

In some embodiments, the first electronic device may further generate a control icon corresponding to the control application, and display the control icon on a display.

Based on the method, the first electronic device may generate the control icon, to start the control application through tapping the control icon.

In some embodiments, the first electronic device may generate the control icon in, but not limited to, the following manners:

Manner 1: The first electronic device obtains icon information corresponding to the first application, and generates the control icon based on the icon information corresponding to the first application.

Manner 2: The first electronic device may generate the control icon based on a preset image or an image selected by the user.

Based on the method, the first electronic device generates the control icon corresponding to the control application.

In some embodiments, after obtaining the start command of the control application, the first electronic device may further send the command information of the first application to the second electronic device, so that the second electronic device executes the action of the first application based on the received command information of the first application.

Based on the method, the first electronic device may implement cross-device application control through sending the command information of the first application to the second electronic device.

In some embodiments, the first electronic device may generate the control application in the following operations. The operations include:

obtaining command information of a second application, where the second application is on the first electronic device and/or a third electronic device, and the command information of the second application is used to implement an action of the second application; and generating the control application based on the command information of the first application and the command information of the second application, where the control application is further used to enable the first electronic device and/or the third electronic device to implement the action of the second application.

When the second application is on the first electronic device, after obtaining the start command of the control application, the first electronic device may further execute the action of the second application based on the command information of the second application. When the second application is on the third electronic device, after obtaining the start command of the control application, the first electronic device may further send the command information of the second application to the third electronic device, so that the third electronic device executes the action of the second application based on the received command information of the second application.

In some embodiments, the control application can not only enable the second electronic device to implement the action of the first application, but also enable the first electronic device or the third electronic device to implement the action of the second application. It should be noted that, in this embodiment of this application, a quantity of electronic devices that need to be collaboratively controlled is not limited, and a quantity of applications that need to be collaboratively controlled is not limited.

In some embodiments, the control application may integrate a plurality of applications on a plurality of electronic devices. In some embodiments, the first electronic device may implement an application control function of a plurality of electronic devices through starting the control application.

In some embodiments, the first electronic device may obtain the start command of the control application in the following manners:

Manner 1: Detect an operation performed by the user on the control icon corresponding to the control application, and generate the start command of the control application in response to the operation.

Manner 2: Receive a voice instruction of the user through a voice assistant application, and obtain the start command that is of the control application and that is obtained after the voice assistant application parses the voice instruction.

In some embodiments, the user may flexibly start control application through a plurality of operations.

In some embodiments, before obtaining the start command that is of the control application and that is obtained after the voice assistant application parses the voice instruction, the first electronic device further needs to add the first application to an application list managed by the voice assistant application.

In some embodiments, a use range of the voice assistant application can be expanded. Through the voice assistant application, the user can open, based on the voice instruction, an application on another electronic device.

In some embodiments, when obtaining the command information of the first application, the first electronic device may further obtain information about the second electronic device. In this way, the first electronic device may send the command information of the first application to the second electronic device based on the information about the second electronic device.

In some embodiments, before sending the command information of the first application to the second electronic device, if it is determined that a connection to the second electronic device is not established, the first electronic device sends a turn-on signal to the second electronic device; and establishes the connection to the second electronic device after the second electronic device is turned on.

In some embodiments, the first electronic device may further automatically start another electronic device, and establish a connection to another electronic device, thereby reducing operations of the user in a collaborative control process and improving user experience.

In some embodiments, the first electronic device may further obtain information about a fourth electronic device associated with the second electronic device. In this case, before sending the command information of the first application to the second electronic device, if it is determined that a connection to the fourth electronic device is not established, the first electronic device sends a turn-on signal to the fourth electronic device; and establishes the connection to the fourth electronic device after the fourth electronic device is turned on.

In some embodiments, the first electronic device may further control starting of the fourth electronic device associated with the second electronic device. Therefore, the connection can be automatically established between the fourth electronic device in an on state and the second electronic device in an on state, to ensure that the second electronic device can cooperate with the fourth electronic device to implement the action of the first application.

In some embodiments, the first electronic device may obtain the command information of the first application in the following manners:

Manner 1: Send a first control request to the second electronic device, so that the second electronic device feeds back the command information of the first application based on the first control request. Receive the command information that is of the first application and that is sent by the second electronic device.

Manner 2: Receive a second control request from the second electronic device, where the second control request includes the command information of the first application.

In some embodiments, the first electronic device may obtain the command information of the first application in a plurality of manners.

In some embodiments, after generating the control application, the first electronic device may further send the command information of the control application to a fifth electronic device. The command information of the control application is used to start the control application. In this way, the fifth electronic device may generate a new control application on the fifth electronic device based on the command information of the control application.

In some embodiments, this application further provides a control apparatus. The control apparatus may be used in an electronic device, and includes a unit or a module configured to perform each operation of embodiments discussed herein.

In some embodiments, this application provides an electronic device, including at least one processing element and at least one storage element. The at least one storage element is configured to store a program and data. The at least one processing element is configured to perform the method provided in embodiments discussed herein.

In some embodiments, this application further provides a computer storage medium. The storage medium stores a software program. When the software program is read and executed by one or more processors, the method provided in the embodiments discussed herein can be implemented.

In some embodiments, this application further provides a computer program product including instructions. When the computer program product is run on a computer, the computer is enabled to perform the method provided in the embodiments discussed herein.

In some embodiments, this application provides a chip system. The chip system includes a processor, configured to support an electronic device in implementing the functions in the embodiments discussed herein. In some embodiments, the chip system further includes a memory. The memory is configured to store program instructions and data for the electronic device. The chip system may include a chip, or may include a chip and another discrete component.

DESCRIPTION OF EMBODIMENTS

Figure 1:
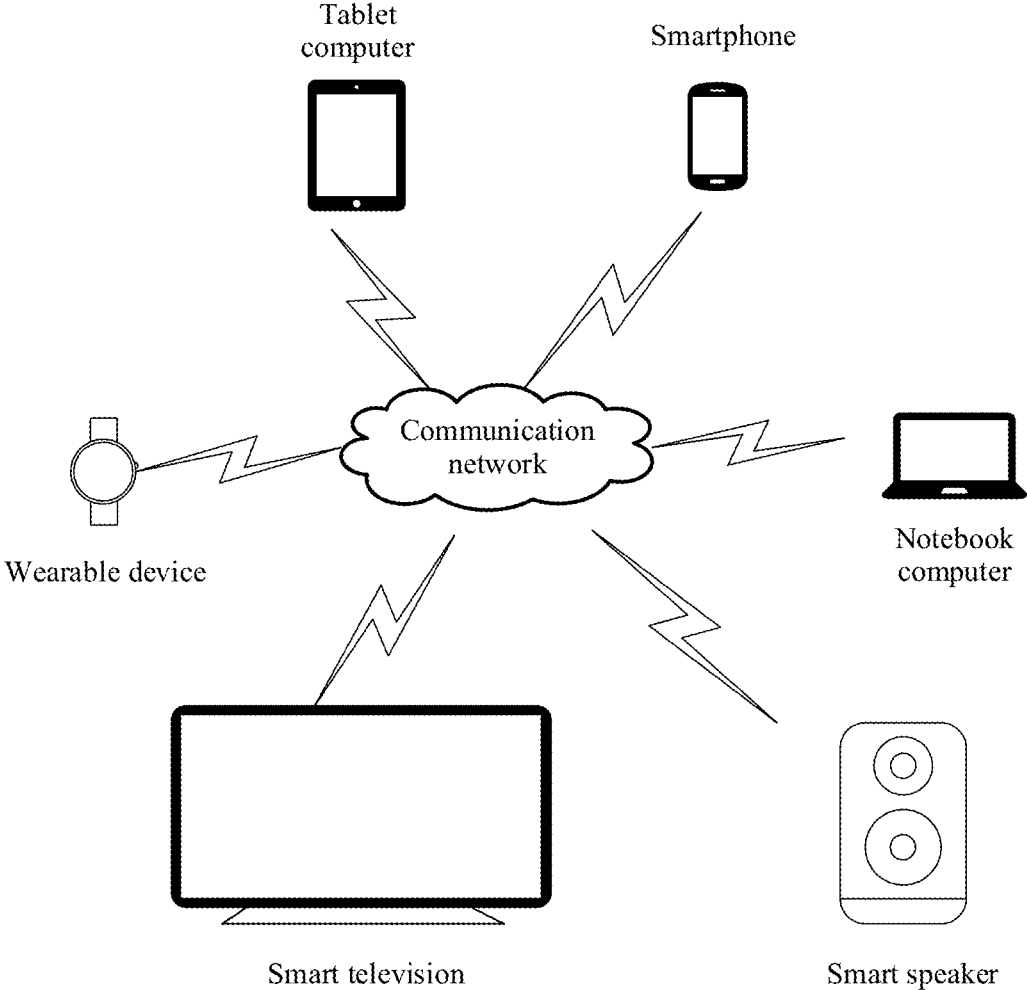
FIG. 1 is a schematic diagram of an application scenario according to an embodiment of this application.

This application provides a control method and apparatus, and an electronic device, to implement a cross-device application control function, thereby implementing multi-device collaboration. The method and the electronic device are based on a same technical concept. Because the method, the apparatus, and the electronic device have similar problem-resolving principles, mutual reference may be made among implementations of the apparatus, the electronic device, and the method. Repeated description is not provided.

In the solutions provided in the embodiments of this application, an electronic device may obtain command information of an application on another electronic device, and generate a control application based on the command information. In this way, a user can start the control application to enable another electronic device to implement an action of the application. Apparently, based on this method, the electronic device may implement a cross-device application control function through generating the control application, to implement multi-device collaboration and improve user experience.

In the following, some terms in this application are described, to help a person skilled in the art have a better understanding.

(1) An electronic device is a device or an apparatus that has a data connection function, a data calculation function, and a data processing function. For example, the electronic device may be a mobile phone, a tablet computer, a notebook computer, a netbook, an in-vehicle device, a business smart terminal (including a video phone, a conference desktop smart terminal, and the like), a personal digital assistant (PDA), an augmented reality (AR) device/a virtual reality (VR) device, or the like. A form of the electronic device is not limited in this application.

(2) An application (APP) is installed on an electronic device, and has a function of providing a service for a user, for example, a camera application that provides a photographing service function, the WeChat application or the QQ application that provides a chat service function, the iQIYI application or the WeTV application that provides a video service function, or the QQ Music application that provides a music service function. The application may be developed by a manufacturer of the electronic device, or developed by a supplier of an operating system of the electronic device, or developed by a third-party application provider. This is not limited in this application.

(3) Command information of an application is used to implement an action (that is, a function, a service, a task, an operation, or the like) of the application. In some embodiments, the command information of the application may include related information of the action, and includes a type of the action, related data, additional data, and the like.

In the Android system, the command information of the application may be indicated by an intent. The Android system may assist in interaction and communication between applications by using an intent mechanism. The intent is an abstract description of an action that needs to be executed in an application, and may be used as a parameter of the application. The Android system may be responsible for finding a corresponding component based on the description of the intent, and transmitting the intent to a component that needs to be invoked, to complete invoking the component. The intent can be used not only between applications, but also for interaction between an activity and a service in an application. Therefore, the intent acts as a medium to provide related information about component invocation and implement decoupling between an invoking party and an invoked party. Expression forms of the intent include: starting an activity, starting a service, binding an activity and a service to establish communication between the two, and sending a broadcast.

The broadcast is sent. The broadcast is sent to broadcast receivers based on a broadcast function Context.sendBroadcastsO/Context.sendOrderedBroadcast( )/Context.sendStickyBroadcast( ).

Primary attributes of the intent information include a type of a performed action and operation data. Secondary attributes (that is, additional data included in the intent information) include a category, a data type, a component, and additional information (extras).

(4) "A plurality of" means two or more. "At least one" means one or more.

(5) The term "and/or" describes an association relationship between associated objects and indicates that three relationships may exist. For example, A and/or B may represent the following three cases: Only A exists, both A and B exist, and only B exists. The character "/" generally indicates an "or" relationship between associated objects.

In addition, it should be understood that in the description of this application, terms such as "first" and "second" are merely used for distinctive description, and shall not be understood as an indication or implication of relative importance, or shall not be understood as an indicating or implication of a sequence.

The following describes a diagram of architecture of an application scenario in which the embodiments of this application can be used. As shown in FIG. 1, the application scenario includes a plurality of electronic devices.

In this application scenario, different electronic devices can communicate with each other over a communication network. For example, the communication network may be a local area network (for example, a home local area network or a smart home local area network). For another example, the communication network may be alternatively a network formed by using a technology such as wireless fidelity (Wi-Fi), Bluetooth (BT), a near field wireless communication (NFC) technology, an infrared (IR) technology, or a direct connection (sidelink) communication technology. This is not limited in this application. In this application scenario, when a communication connection has been established between two electronic devices in a same communication network, the two electronic devices are both in an on state, and communication is normal in the communication network, the two electronic devices may both automatically access the communication network, and a connection is established between the two electronic devices.

It should be noted that any electronic device in the application scenario may serve as a control device with a control function. Similarly, any electronic device may also serve as a collaborative device, that is, a controlled device on which an application is controlled.

For example, in the application scenario of the smart home system shown in FIG. 1, a smartphone may control at least one of electronic devices such as a smart television, a smart speaker, a notebook computer, and a wearable device.

It can be understood that the foregoing application scenario described in the embodiments of the present disclosure is intended to describe the technical solutions in the embodiments of the present disclosure more clearly, and does not constitute a limitation on the technical solutions provided in the embodiments of the present disclosure. A person of ordinary skill in the art may know that, with evolution of network architecture and emergence of a new service, the technical solutions provided in the embodiments of the present disclosure are also applicable to similar technical problems. For example, the method may be further applied to various other application scenarios, for example, application scenarios such as vehicle-to-everything (V2X), long term evolution-Internet of vehicles (LTE-vehicle, LTE-V), vehicle-to-vehicle (V2V), Internet of vehicles, machine type communication (MTC), Internet of things (IoT), long term evolution-machine to machine (LTE-machine to machine, LTE-M), and machine-to-machine (M2M).

Figure 2:
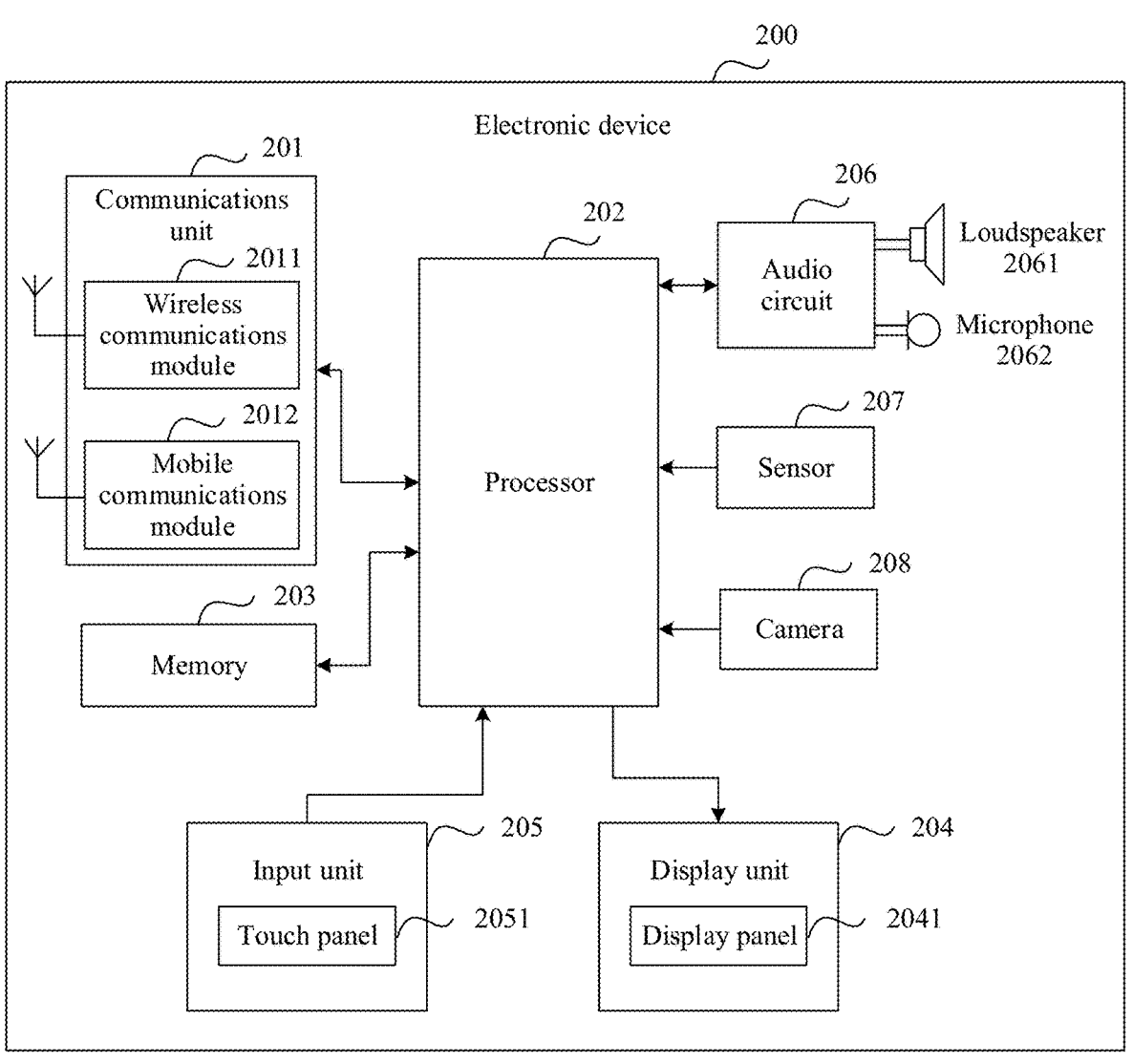
FIG. 2 is a diagram of a structure of an electronic device according to an embodiment of this application.

The control method provided in the embodiments of this application may be applied to any electronic device in the application scenario shown in FIG. 1. The following describes a structure of the electronic device. FIG. 2 is a diagram of a structure of a possible electronic device to which a method is applicable according to an embodiment of this application. As shown in FIG. 2, an electronic device 200 includes components such as a communications unit 201, a processor 202, a memory 203, a display unit 204, an input unit 205, an audio circuit 206, a sensor 207, and a camera 208. The following describes the components of the electronic device 200 with reference to FIG. 2.

The communications unit 201 is configured to implement functions of the electronic device 200, to implement data communication with another device. In some embodiments, the communications unit 201 may include a wireless communications module 2011 and a mobile communications module 2012. In addition to the communications unit 201, the electronic device 200 further needs to cooperate with components such as an antenna, and a modem processor and a baseband processor in the processor 202 to implement a communication function.

The wireless communications module 2011 may provide wireless communication solutions that are applied to the electronic device and that include a wireless local area network (WLAN) (such as a wireless fidelity (Wi-Fi) network), Bluetooth (BT), a global navigation satellite system (GNSS), frequency modulation (FM), a near field wireless communication (NFC) technology, an infrared technology (IR), and the like. The wireless communications module 2011 may be one or more components integrating at least one communications processing module. The wireless communications module 2011 receives an electromagnetic wave through an antenna, performs signal frequency modulation and filtering processing on the electromagnetic wave, and sends a processed signal to the processor 202. The wireless communications module 2011 may further receive a to-be-sent signal from the processor 202, perform frequency modulation and amplification on the signal, and convert the signal obtained after the frequency modulation and amplification into an electromagnetic wave for radiation through the antenna.

The mobile communications module 2012 may provide a mobile communication solution that is applied to the electronic device and that includes 2G/3G/4G/5G or the like. The mobile communications module 2012 may include at least one filter, a switch, a power amplifier, a low noise amplifier (LNA), and the like. The mobile communications module 2012 may receive an electromagnetic wave through the antenna, perform processing such as filtering and amplification on the received electromagnetic wave, and transmit the processed electromagnetic wave to the modem processor for demodulation. The mobile communications module 2012 may further amplify a signal modulated by the modem processor, and convert the amplified signal into an electromagnetic wave for radiation through the antenna. In some embodiments, at least some functional modules in the mobile communications module 2012 may be disposed in the processor 202. In some embodiments, at least some functional modules in the mobile communications module 2012 may be disposed in a same device as at least some modules in the processor 202.

The electronic device 200 may establish a wireless connection to a base station in a mobile communications system through the mobile communications module 2012, and receive a service of the mobile communications system through the mobile communications module 2012.

When the electronic device 200 implements the control method provided in the embodiments of this application, through the wireless communications module 2011 or the mobile communications module 2012 in the communications unit 201, the electronic device 200 may send command information of an application to another electronic device, or receive command information of an application of another electronic device, or the like; and may further send a turn-on signal to another electronic device, or receive a turn-on signal of another electronic device.

The communications unit 201 may further include a communications interface, configured to implement a physical connection between the electronic device 200 and another device. The communications interface may be connected to a communications interface of another device through a cable, to implement data transmission between the terminal device 200 and the other device.

The memory 203 may be configured to store a software program and data. The processor 202 runs the software program and data stored in the memory 203, to perform various functions of the terminal device 200 and process data. In this embodiment of this application, the software program may be a control program for implementing a control method, a program of each application, or the like.

In some embodiments, the memory 203 may mainly include a program storage region and a data storage region. The program storage region may store an operating system, various software programs, and the like. The data storage region may store data input by a user or data created by the terminal device 200 in a process of running the software program, and the like. The operating system may be HarmonyOS®, IOS®, Android®, Microsoft®, or the like. In addition, the memory 203 may include a high-speed random access memory, and may further include a non-volatile memory, for example, at least one magnetic disk storage device, a flash memory device, or another volatile solid-state storage device. For example, in this embodiment of this application, the control program for implementing the control method, the program of each application, and the like may be stored in the program storage region; and data such as command information and an icon of an application may be stored in the data storage region.

The input unit 205 may be configured to receive character information and a signal that are input by the user. In some embodiments, the input unit 205 may include a touch panel 2051 and another input device (for example, a function key). The touch panel 2051, also referred to as a touchscreen, can collect a touch operation performed by the user on or near the touch panel 2051, generate corresponding touch information, and send the touch information to the processor 202, so that the processor 202 executes a command corresponding to the touch information. The touch panel 2051 may be implemented through a plurality of types such as a resistive type, a capacitive type, an infrared type, and a surface acoustic wave type. For example, in this embodiment of this application, the user may select, through the touch panel 2051, an application that needs to be integrated or started.

The display unit 204 is configured to: present a user interface, and implement human-computer interaction. For example, the display unit 204 may display information input by the user or information provided for the user, and content such as various menus of the terminal device 200, main interfaces (including icons of various applications), and windows of various applications. In this embodiment of this application, the processor 202 may display the icons of various applications in the display unit 204.

The display unit 204 may include a display panel 2041. The display panel 2041 may be configured in a form of a liquid crystal display (LCD), an organic light-emitting diode (OLED), or the like.

It should be noted that the touch panel 2051 may cover display panel 2041. In FIG. 2, the touch panel 2051 and the display panel 2041 serve as two independent components to implement input and output functions of the electronic device 200. However, in this embodiment of this application, the touch panel 2051 and the display panel 2041 may be integrated (that is, the touch screen) to implement the input and output functions of the electronic device 200.

The processor 202 is a control center of the electronic device 200, is connected to the components through various interfaces and lines, and performs various functions of the electronic device 200 and processes data through running or executing the software program and/or the module stored in the memory 203 and invoking data stored in the memory 203. Therefore, a plurality of services of the electronic device 200 are implemented. For example, the processor 202 may run a control program stored in the memory 203, to implement the control method provided in the embodiments of this application and generate a control application. In addition, after generating the control application, the processor 202 may further obtain a start command of the control application, and then control the communications unit 201 to send the command information of the application to another electronic device.

In some embodiments, the processor 202 may include one or more processing units. The processor 202 may integrate an application processor, a modem processor, a baseband processor, a graphics processing unit (GPU), and the like. The application processor mainly processes an operating system, a user interface, an application program, and the like. The modem processor mainly processes wireless communication. It may be understood that the foregoing modem processor may be alternatively not integrated into the processor 202.

The audio circuit 206 (including a speaker 2061 and a microphone 2062) may provide an audio interface between the user and the terminal device 200. The audio circuit 206 may transmit, to the speaker 2061, an electrical signal converted from received audio data, and the speaker 2061 converts the electrical signal into a sound signal for output. In addition, the microphone 2062 converts a collected sound signal into an electrical signal; and the audio circuit 206 receives the electrical signal, and then converts the electrical signal into audio data for further processing such as transmission or storage. In this embodiment of this application, the voice assistant application on the electronic device 200 may collect a voice instruction of the user through the microphone 2062, to parse the voice instruction and obtain a corresponding command.

The electronic device 200 may further include one or more sensors 207, for example, an optical sensor, a motion sensor, an ultrasonic sensor, and another sensor. The electronic device 200 may implement various functions based on real-time sensor data collected by the sensor 207.

The electronic device 200 may further include a camera 208 to collect an image.

A person skilled in the art may understand that a structure of the terminal device shown in FIG. 1 does not constitute a limitation on the terminal device. The terminal device provided in this embodiment of this application may include more or fewer components than those shown in the figure, some components may be combined, or a different component deployment may be used.

A software system of the electronic device provided in this application may use layered architecture, event-driven architecture, microkernel architecture, microservice architecture, or cloud architecture. In the embodiments of this application, an Android system with layered architecture is used as an example to describe software structure of an electronic device.

Figure 3:
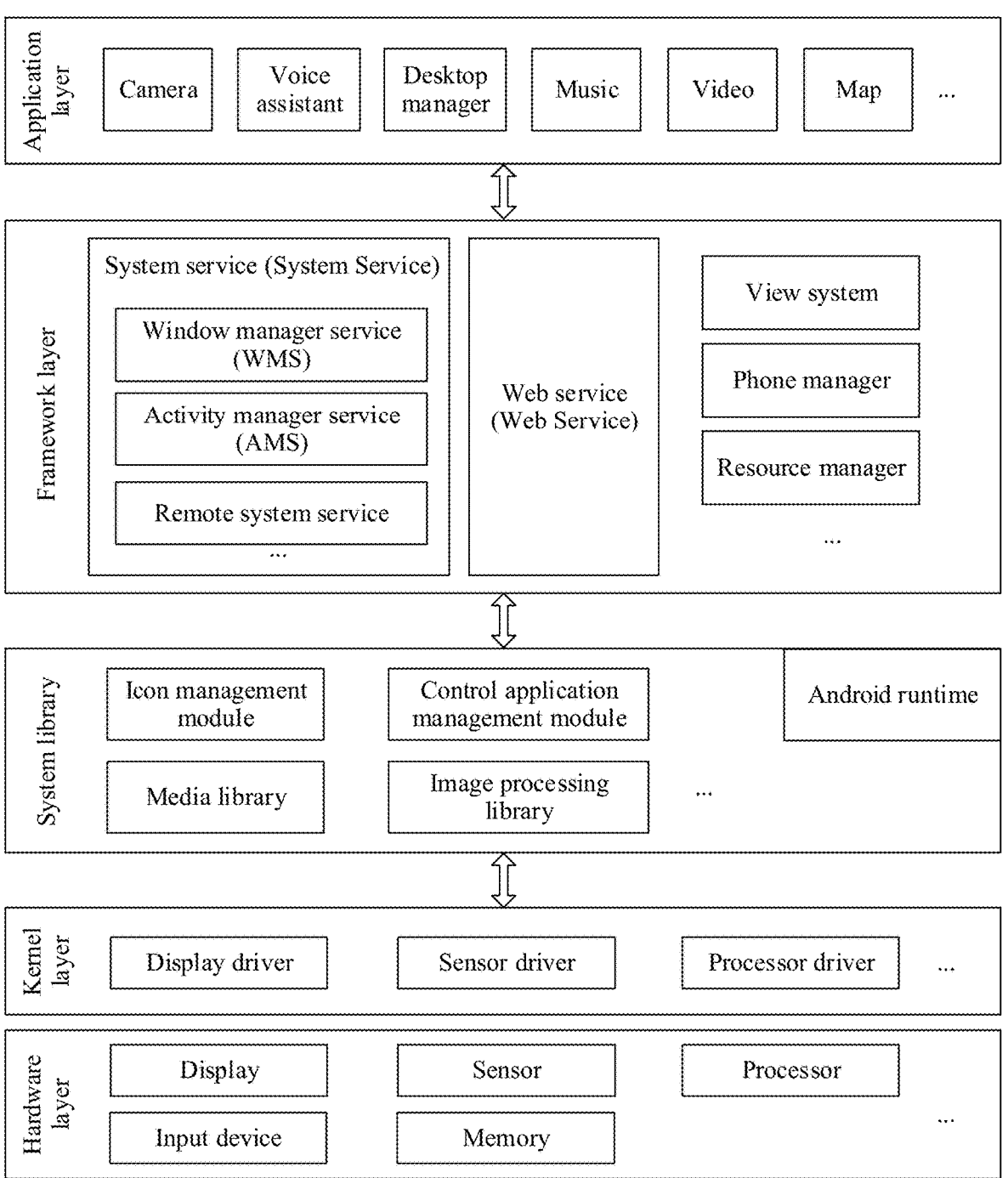
FIG. 3 is a diagram of software architecture of an electronic device according to an embodiment of this application.

FIG. 3 is a block diagram of a software structure of an electronic device according to an embodiment of this application. As shown in FIG. 3, the software structure of the electronic device may be layered architecture. For example, software may be divided into several layers, and each layer has a clear role and responsibility. The layers communicate with each other through a software interface. In some embodiments, the Android system is divided into four layers: an application layer, a framework (FWK) layer, an Android runtime and system library, and a kernel layer from top to bottom.

The application layer may include a series of applications. As shown in FIG. 3, the application layer may include a camera application, a voice assistant application, a desktop management (for example, Huawei Launcher Huawei Launcher) application, a music application, a video application, a map application, a third-party application, and the like. The third-party application may include the WeChat application, the iQIYI application, and the like.

Figure 6A:
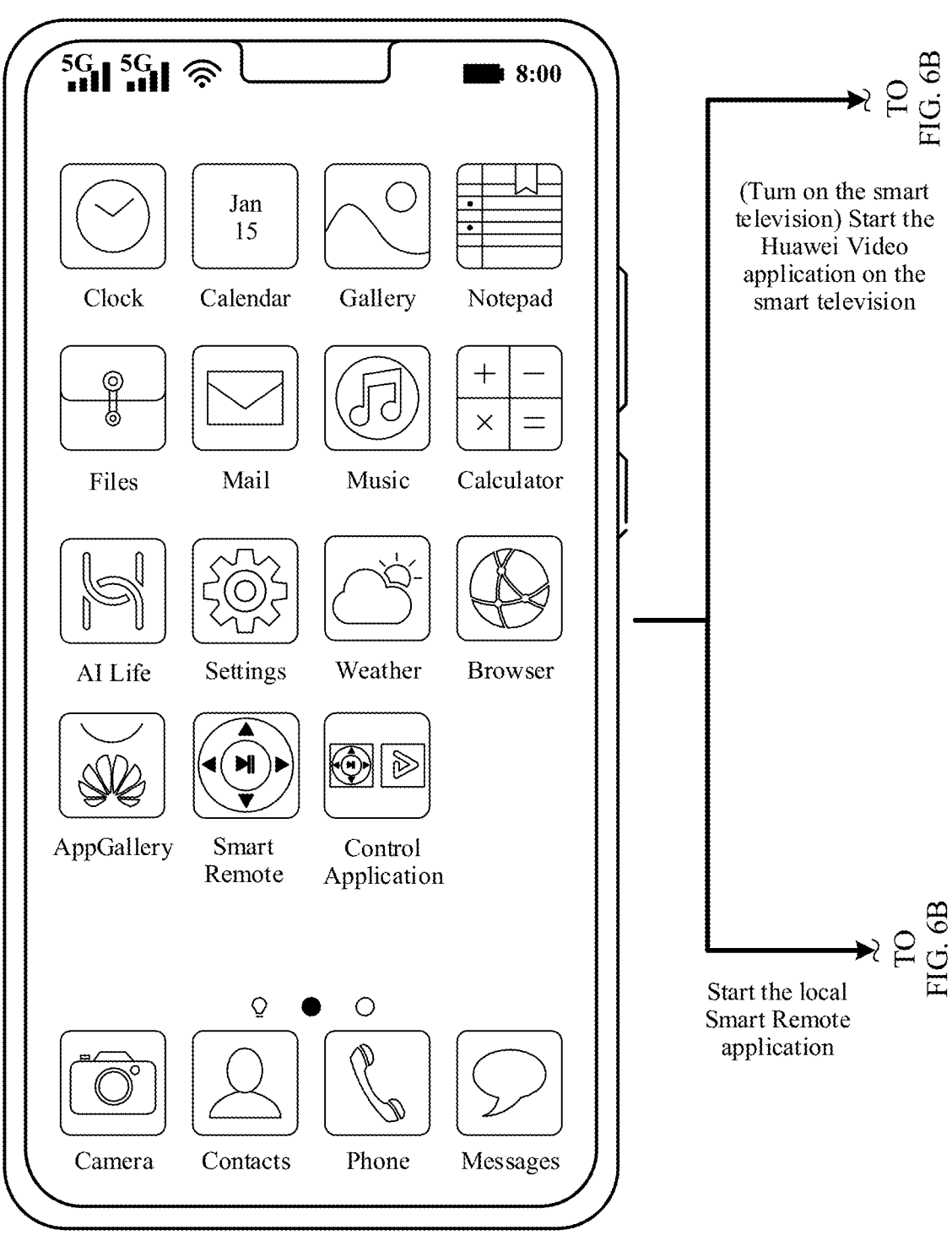
FIG. 6A and FIG. 6B are a schematic diagram of an instance of a control method according to an embodiment of this application.
Figure 6B:
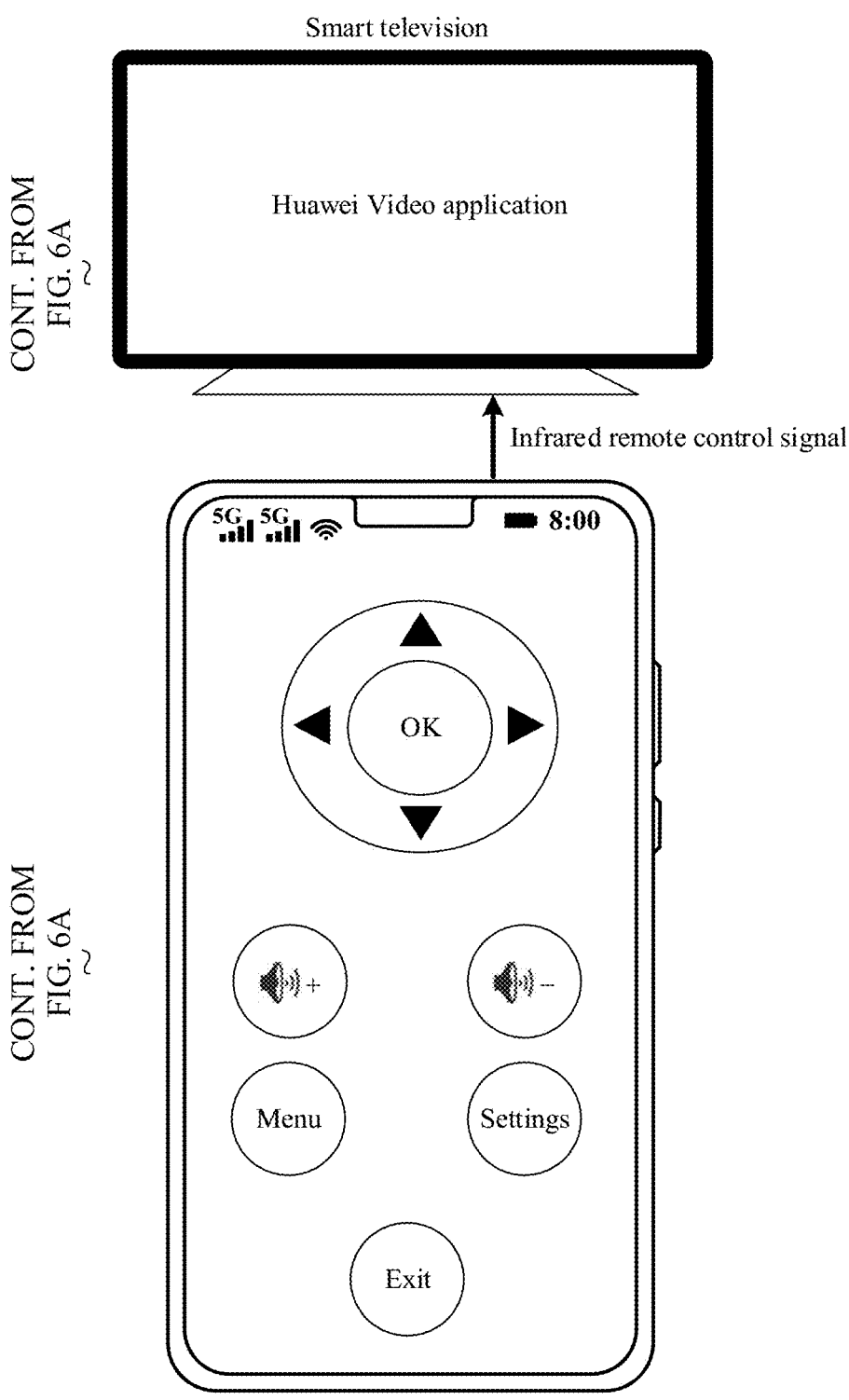

The framework layer provides an application programming interface (API) and a programming framework for the applications at the application layer. The application framework layer may include some predefined functions. As shown in FIG. 6A and FIG. 6B, the application framework layer may include: a system service, a view system, a web service, a phone manager, a resource manager, and the like.

The system service may include a window manager service (WMS) and an activity manager service (AMS). In this embodiment of this application, a new system-level service, namely, a remote system service may be further added to the system service. The following separately describes various services in the system service.

Window manager service: The window manager service is provided for a window, and controls displaying and hiding of all windows and positions of all the windows on a display. The window manager service may be responsible for the following functions: 1. Allocate a display surface to each window. 2. Manage a display sequence, sizes, and positions of the surfaces. 3. Invoke a management function (such as a surface control function (SurfaceControl.Transaction)) to adjust transparency, a stretch coefficient, a position, and a size of the window to implement animation effect of the window. 4. Relate to an input system. For example, when the electronic device receives a touch event, the electronic device may provide, through window manager service, a proper window for the user to display or process a message.

The activity manager service provides a management service for an activity in an application. The activity manager service may be responsible for, but not limited to, the following functions: 1. Uniformly schedule life cycles of activities in all applications. 2. Start or stop a process of an application. 3. Start and schedule a life cycle of a service. 4. Register a broadcast receiver, and receive and distribute a broadcast. 5. Query a current running status of the system. 6. Schedule a task.

The remote system service is used to implement interaction of signaling between different electronic devices, command information of an application, and the like in the control method in the embodiments of this application. For example, the electronic device may send a first control request to another electronic device through the remote system service, so that another electronic device feeds back, based on the first control request, command information of an application that needs to be controlled. In addition, the electronic device may subsequently receive, through the remote system service, the command information that is of the application and that is sent by the other electronic device. For another example, the electronic device may receive a second control request (including the command information of the application) sent by the other electronic device. For still another example, after obtaining a start command of the to-be-controlled application, the electronic device may further send the command information of the application to another electronic device through the remote system service.

The view system includes visual controls, for example, a text display control and an image display control. The view system may be used for application construction. The interface may include one or more controls. For example, an interface including an SMS notification icon may include a text display control and an image display control.

The web service is an API that can be invoked through a web page. The phone manager is configured to provide a communication function of the electronic device, for example, management of a call status (including answering, declining, or the like). The resource manager provides various resources such as a localized character string, an icon, an image, a layout file, and a video file for an application.

The Android runtime includes a kernel library and a virtual machine. The Android runtime is responsible for scheduling and management of the Android system. The kernel library includes two parts: One part is a function that needs to be invoked in a java language, and the other part is a kernel library of the Android system and is used to provide an input/output service and a kernel service for the Android system. The application layer and the framework layer may be run in a virtual machine. The virtual machine executes java files at the application layer and the framework layer as binary files. The virtual machine is configured to implement functions such as object life cycle management, stack management, thread management, security and exception management, and garbage collection.

The system library may include a plurality of functional modules, for example, an icon management module, an integration application management module, a media library (media libraries), and an image processing library.

A control application management module is configured to: determine command information of a local application that needs to be controlled and that is selected by the user; or generate a control application (which may also be referred to as an integration application) based on the obtained command information of the application on another electronic device.

The icon management module is configured to correspondingly generate a control icon of the control application in a process of generating the control application.

The media library supports playback and recording of audios and videos in a plurality of formats, and opening of static images in a plurality of formats. The media library may support a plurality of audio and video encoding formats such as MPEG-4, H.264, MP3, AAC, AMR, JPG, and PNG.

The kernel layer is a layer between hardware and software. The kernel layer includes at least a display driver, a sensor driver, a processor driver, a camera driver, an audio driver, and the like; and is configured to drive hardware at a hardware layer.

The hardware layer may include various types of sensors, displays, processors, input devices, memories, cameras, and the like.

To implement cross-device application control and multi-device collaboration of the electronic device, an embodiment of this application provides a control method. The method may be applied to the application scenario including a plurality of electronic devices shown in FIG. 1. The method includes two processes: generating a control application and starting the control application. Based on the software structure of the electronic device shown in FIG. 3, the following describes in detail the two processes of generating the control application and starting the control application respectively with reference to FIG. 4A and FIG. 4B by using an example in which a first electronic device collaboratively controls a first application of the first electronic device and a second application of a second electronic device.

Figure 4A:
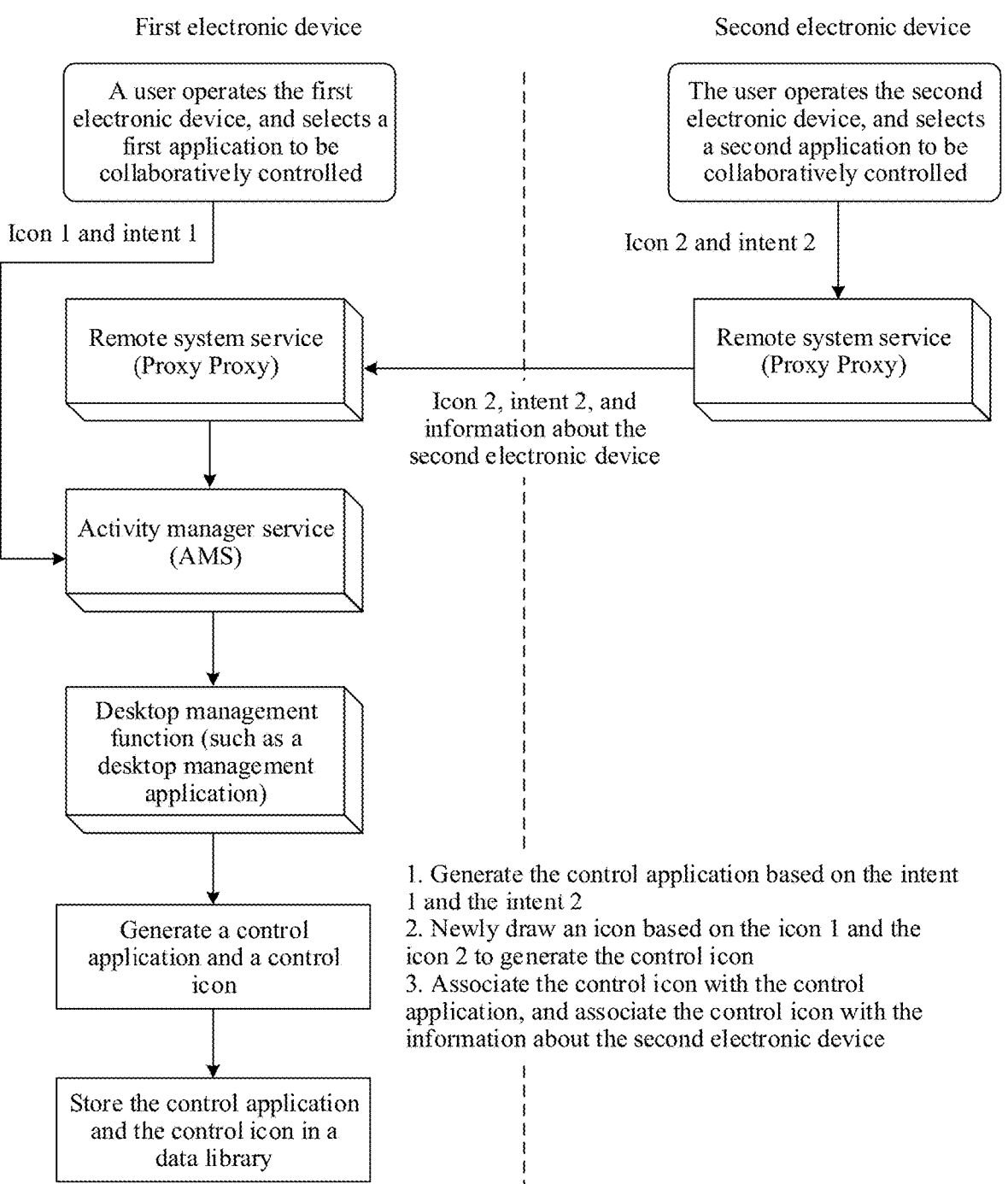
FIG. 4A is a schematic diagram of a process of generating a control application according to an embodiment of this application.

As shown in FIG. 4A, the process of generating the control application includes the following operations:

When the user expects to generate the control application of the first application and the second application on the first electronic device, the user needs to operate the second electronic device, select, on the second electronic device, the second application to be collaboratively controlled, and determine that a collaboratively controlling device is the first electronic device.

The second electronic device transmits an icon 2 (that is, Icon2) and an intent 2 (that is, Intent2) of the second application to a remote system service of the second electronic device according to the operation of the user. In this case, the icon 2 and the intent 2 may be transmitted to the remote system service in a plurality of network communication manners, for example, a broadcast (that is, Broadcast) and a socket. After establishing a connection to a remote system service of the first electronic device through verification, the remote system service of the second electronic device sends a control request to a remote system service of the first electronic device. The control request includes the icon 2 and the intent 2 of the second application, and information about the second electronic device. In some embodiments, the control request may further include related information (for example, an application name and application function information) of the second application.

After receiving the control request of the second electronic device through the remote system service, the first electronic device may prompt the user whether to select a local application for collaborative control (that is, integrating/combining) with the second application, and transmit various information in the control request to an activity manager service (AMS) of the first electronic device. After the user operates the first electronic device to select the to-be-collaborated first application, the first electronic device transmits an icon 1 (that is, Icon1) and an intent 1 (that is, Intent1) of the first application to the activity manager service according to the operation of the user. For example, the icon 1 and the intent 1 may also be transmitted in a network communication manner such as a broadcast or a socket. The activity manager service of the first electronic device transmits the received icon 1 and intent 1 of the first application, the received icon 2 and intent 2 of the second application, and the received information of the second electronic device to a desktop management function (for example, Huawei Launcher) of the first electronic device. For example, the foregoing information may also be transmitted to the desktop management function in a network communication manner such as a broadcast or a socket. The desktop management function generates the control application and a control icon based on the received information. As shown in the figure, this process includes the following operations:

1. The desktop management function generates the control application based on the intent 1 of the first application and the intent 2 of the second application.

2. The desktop management function newly draws (for example, draws in a combination manner) an icon based on the icon 1 of the first application and the icon 2 of the second application, to generate the control icon. In some other embodiments, the desktop management function may further generate the control icon based on a preset image or an image selected by the user.

3. The desktop management function associates the control icon with the control application (that is, associates the control icon with the intent 1 and the intent 2), and associates the control icon with the information about the second electronic device.

It should be noted that the control icon is actually a shortcut icon in a new type, and a single icon may be associated with an intent of an application on at least one electronic device.

Finally, the first electronic device may store the generated control application and the generated control icon into a database.

Figure 4B:
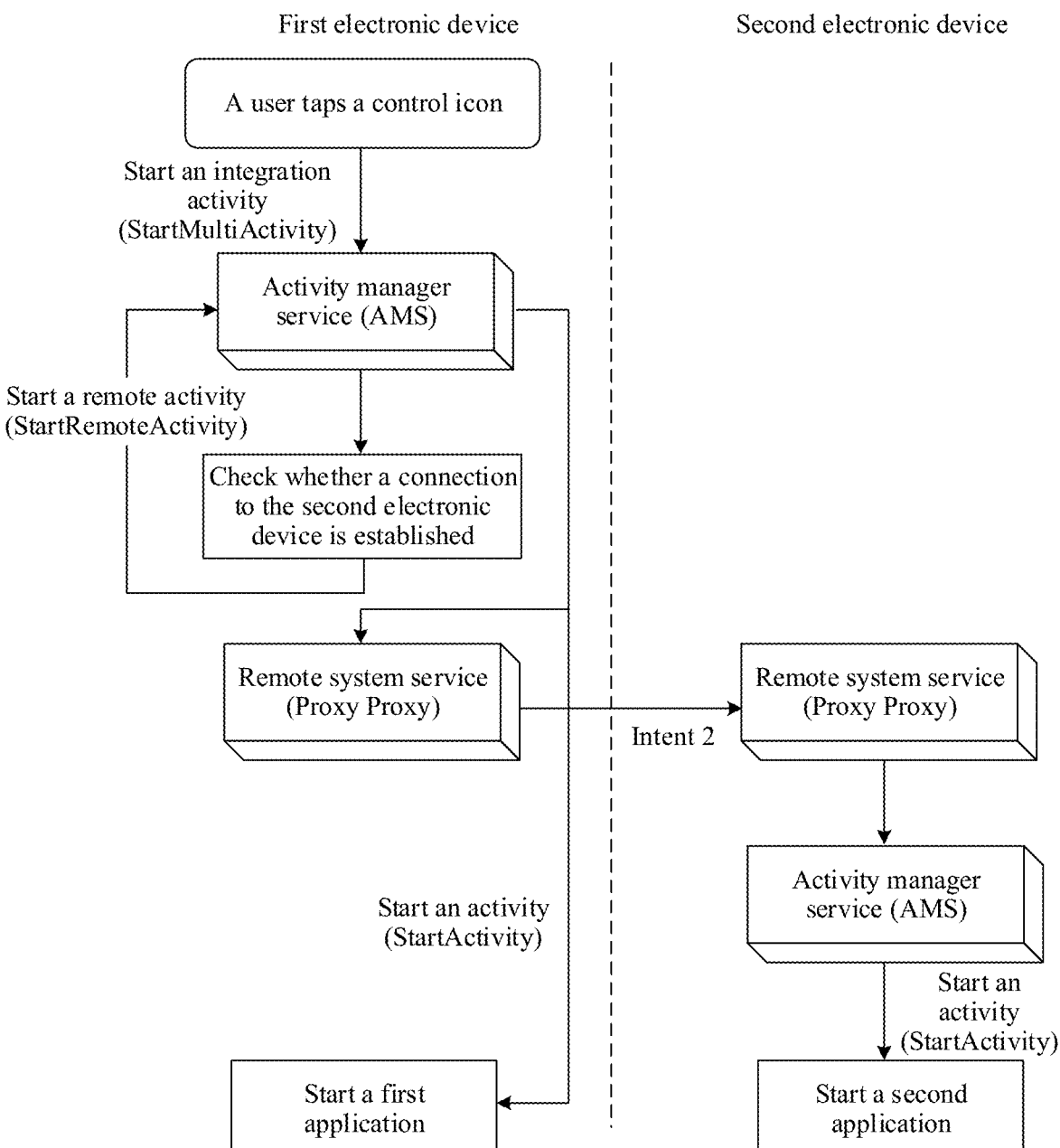
FIG. 4B is a schematic diagram of a process of starting a control application according to an embodiment of this application.

As shown in FIG. 4B, the process of starting the control application includes the following operations:

When the user expects to start the control application of the first electronic device, the user needs to operate the first electronic device and tap the control icon on the first electronic device.

The first electronic device instructs, according to the operation of the user, the internal activity manager service (AMS) to start an integration activity (StartMultiActivity). The activity manager service of the first electronic device determines that the current time of starting is cross-device starting of the control application. Therefore, the activity manager service of the first electronic device determines, based on the intents (the intent 1 and the intent 2) associated with the control application, that the first application corresponding to the intent 1 is on the first electronic device, and determines that the second application corresponding to the intent 2 is on the second electronic device. The activity manager service of the first electronic device directly starts the first application through starting an activity (StartActivity), to implement an action corresponding to the intent 1. In addition, for the second electronic device, the first electronic device first checks whether the connection to the second electronic device is established. If it is determined that the connection is not established (identifying that the second electronic device is not turned on), the first electronic device sends a turn-on signal (for example, an infrared signal) to the second electronic device. In this way, after the second electronic device is turned on, the second electronic device automatically establishes the connection to the first electronic device. When the first electronic device determines to establish the connection to the second electronic device, the first electronic device instructs the internal activity manager service (AMS) to start a remote activity (StartRemoteActivity). The activity manager service of the first electronic device starts a remote system service, so that the remote system service of the first electronic device sends the intent 2 to a remote system service of the second electronic device based on the information about the second electronic device.

After receiving the intent 2, the remote system service of the second electronic device sends the intent 2 to an internal activity manager service (AMS). The activity manager service of the second electronic device starts the second application through starting an activity (StartActivity), to implement an action corresponding to the intent 2.

In this embodiment of this application, the first electronic device may generate the control application based on the intent of the application on the second electronic device, and send the intent to the second electronic device when the user starts the control application, so that the second electronic device implements the action corresponding to the intent. Finally, cross-device application control is implemented, and multi-device collaboration is further implemented.

It should be noted that for the description of the intent of the application in this embodiment of this application, reference may be made to the description of the term explanation of the command information of the application in the foregoing content. Details are not described herein again.

Figure 5:
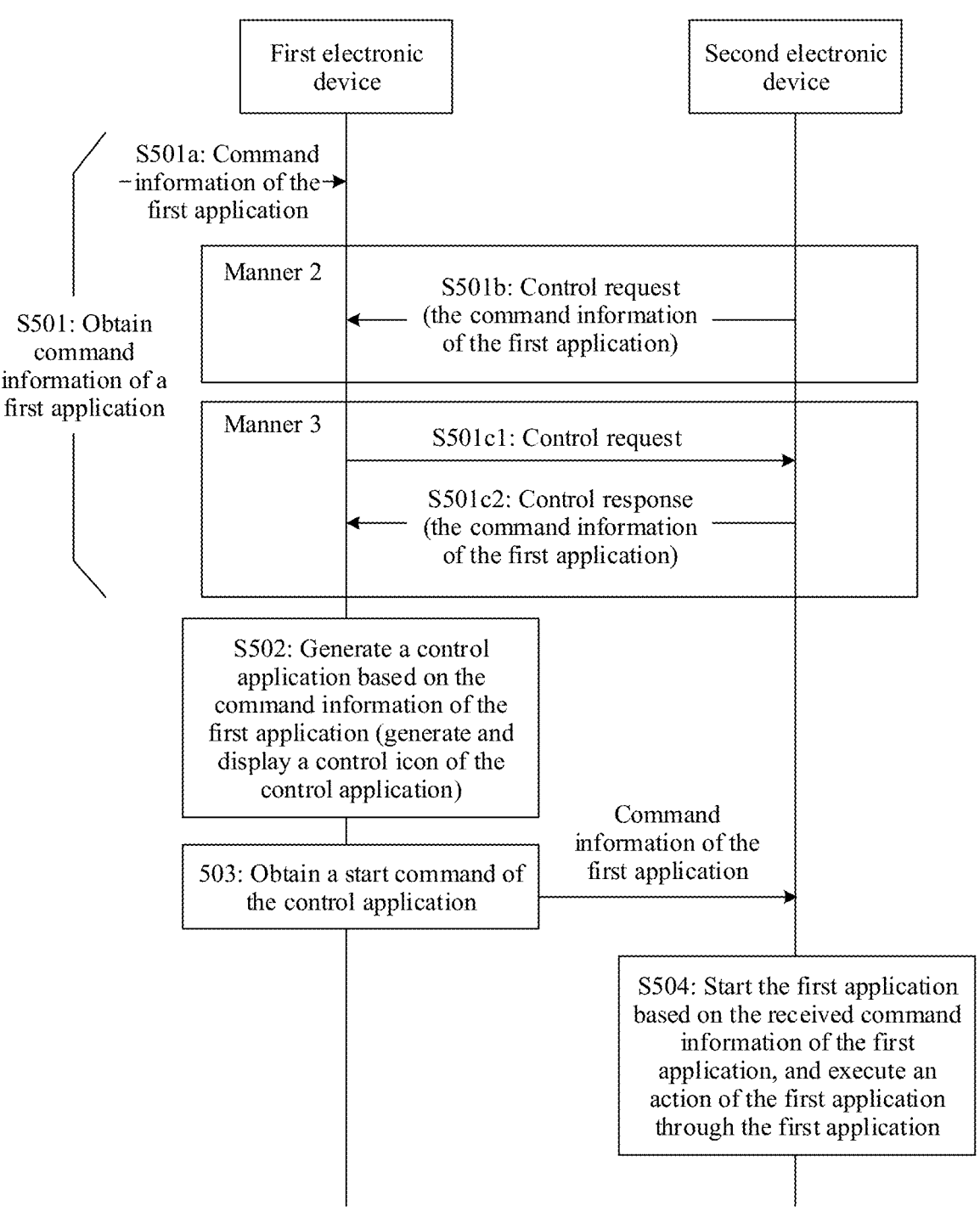
FIG. 5 is a flowchart of a control method according to an embodiment of this application.

An embodiment of this application provides another control method. The method may be applied to an application scenario with a plurality of electronic devices shown in FIG. 1. In this embodiment of this application, the first electronic device serves as an electronic device for controlling another device. The first electronic device may be an electronic device that is portable and easy to operate for the user, for example, a smartphone or a wearable device. As a controlled electronic device, the second electronic device may be various electronic devices. This is not limited in this application. The following describes in detail a process of the method with reference to a flowchart of a control method shown in FIG. 5.

S501: The first electronic device obtains command information of a first application. The first application is on the second electronic device. The command information of the first application is used to implement an action of the first application.

In some embodiments, the command information of the first application may be an intent of the first application.

In different scenarios, the first electronic device may obtain the command information of the first application in, but not limited to, three manners shown in the figure. The following separately describes each manner.

Manner 1: In operation S501a, the first electronic device receives the command information that is of the first application and that is input by a user or come from another device.

Manner 2: The user operates the second electronic device, selects, from an application of the second electronic device, the first application to be collaboratively controlled, and selects the collaboratively controlling first electronic device. Then, in operation S501b, the second electronic device sends a control request to the first electronic device. The control request carries the command information of the first application. The first electronic device receives the command information of the first application from the second electronic device.

Manner 3:

In some embodiments, the user operates the first electronic device, selects, from the first electronic device, the second electronic device to be collaboratively controlled, and selects the first application to be collaboratively controlled. Then, in operation S501c1, the first electronic device sends a control request to the second electronic device. The control request carries information about the first application. Therefore, the second electronic device feeds back the command information of the first application based on the control request. After receiving the control request, the second electronic device prompts the user whether the first electronic device needs to perform collaborative control on the first application. When the user selects an option indicating that the collaborative control needs to be performed on the first application, in operation S501c2, the second electronic device sends a control response to the first electronic device based on the control request. The control response includes the command information of the first application.

In some embodiments, the user operates the first electronic device, and selects, from the first electronic device, the second electronic device to be collaboratively controlled. Then, in operation S501c1, the first electronic device sends a control request to the second electronic device, so that the second electronic device feeds back, based on the control request, the command information of the first application to be collaboratively controlled. After receiving the control request, the second electronic device prompts the user that an application to be collaboratively controlled needs to be selected. Afterwards, the user operates the second electronic device, and selects, from an application of the second electronic device, the first application to be collaboratively controlled. The first electronic device sends a control response to the first electronic device. The control response includes the command information of the first application.

It can be learned from the foregoing description that both the manner 2 and the manner 3 are that the second electronic device sends the command information of the first application to the first electronic device. Therefore, in some embodiments, in the manner 2 and the manner 3, the second electronic device may further send the icon of the first application or the information about the second electronic device to the first electronic device. The icon of the first application is used by the first electronic device to subsequently generate the control icon of the control application. The information about the second electronic device may indicate that the first application is on the second electronic device.

It should be noted that, for a process (for example, operation S501b or operation S501c2) in which the second electronic device sends the command information of the first application to the first electronic device, reference may be made to the process in which the second electronic device sends the icon 2 and the intent 2 in FIG. 4A. Details are not described herein again.

S502: The first electronic device generates the control application based on the command information of the first application. The control application is used to enable the second electronic device to implement the action of the first application.

In some embodiments, the first electronic device generates the control application based on only the command information of the first application. In this case, the control application is used by the first electronic device to collaboratively control the first application on the second electronic device.

In some embodiments, after receiving the command information of the first application in operation S501, the first electronic device may prompt the user whether to select a local application for collaborative control with the first application. If the user selects an option indicating that collaborative control does not need to be performed on the local application, the first electronic device generates the control application based on only the command information of the first application. If the user selects the local second application for collaborative control with the first application, the first electronic device generates the control application based on the command information of the second application and the command information of the first application.

In this case, the control application can not only enable the second electronic device to implement the action of the first application, but also enable the first electronic device to implement the action of the second application.

In some embodiments, the first electronic device may further obtain command information of a third application on another electronic device (the third electronic device is used as an example for description below).

In some embodiments, the first electronic device may generate the control application based on the command information of the first application and the command information of the third application. In this case, the control application can not only enable the second electronic device to implement the action of the first application, but also enable the third electronic device to implement an action of the third application.

In some embodiments, the first electronic device may further prompt the user whether to select a local application for collaborative control with the first application and the third application. If the user selects the local second application for collaborative control with the first application and the third application, the first electronic device generates the control application based on the command information of the first application, the command information of the second application, and the command information of the third application. In this case, the control application can enable the three electronic devices to separately implement the actions of the applications of the three electronic devices. If the user selects an option indicating that collaborative control does not need to be performed on the local application, the first electronic device generates the control application based on the command information of the first application and the command information of the third application. In this case, the control application can not only enable the second electronic device to implement the action of the first application, but also enable the third electronic device to implement the action of the third application.

It should be noted that, in this embodiment of this application, a quantity of electronic devices that need to be collaboratively controlled is not limited, and a quantity of applications that need to be collaboratively controlled is not limited.

In addition, in a process in which the first electronic device performs operation S502 to generate the control application, the first electronic device may further generate the control icon corresponding to the control application, and display the control icon on the display of the first electronic device. In this way, the user can intuitively see that the control application is generated, and the user can start the control application through tapping the control icon.

In some embodiments, the first electronic device may generate the control icon based on a preset image or an image selected by the user.

In some embodiments, the first electronic device may further obtain an icon of each application to be collaboratively controlled, and newly draw an icon (for example, draw in an integration manner, draw in a combination manner, or draw in a layered manner) based on these icons to generate the control icon. For example, the first electronic device may obtain an icon of a corresponding application in a manner the same as a manner of obtaining the command information of the application of another electronic device. For a process, refer to the description of obtaining the command information of the first application in operation S501. Details are not described herein again.

It should be noted that the control icon is actually a shortcut icon of a new type, and a single icon may correspond to command information of an application on at least one electronic device. In order that the first electronic device can subsequently send responded command information to another electronic device when the control application is started, when generating the control icon, the first electronic device may further associate the control icon with information about another electronic device.

For example, the first electronic device may also obtain the information about the corresponding electronic device in a manner the same as a manner of obtaining the command information of the application of the other electronic device. For a process, refer to the description of obtaining the command information of the first application in operation S501. Details are not described herein again.

S503: The first electronic device obtains a start command of the control application, and then sends the command information of the first application to the second electronic device, so that the second electronic device executes the action of the first application based on the received command information of the first application.

In some embodiments, when the first electronic device further generates the control application based on the command information of the local second application and performs operation S503, the first electronic device further needs to execute the action of the second application based on the command information of the second application. In other words, the first electronic device starts the second application based on the command information of the second application, and executes the action of the second application through the second application.

In some embodiments, when the first electronic device further generates the control application based on the command information of the third application on the third electronic device and performs operation S503, the first electronic device further needs to send the command information of the third application to the third electronic device, so that the third electronic device executes the action of the third application based on the received command information of the third application.

It should be noted that, when the first electronic device further associates the control icon with the information about another electronic device in the process of generating the control application, the first electronic device may send the command information of the first application to the second electronic device based on the information about the second electronic device associated with the control icon; and the first electronic device may send the command information of the third application to the third electronic device based on the information about the third electronic device associated with the control icon.

In this embodiment of this application, the first electronic device may obtain the start command of the control application in the following manner:

Manner 1: The first electronic device detects an operation performed by the user on the control icon corresponding to the control application, and the first electronic device generates the start command of the control application in response to the operation.

Manner 2: The first electronic device receives a voice instruction of the user through a voice assistant application, and the first electronic device obtains the start command that is of the control application and that is obtained after the voice assistant application parses the voice instruction.

It should be noted that an application managed by the voice assistant application of the first electronic device is generally an application on the first electronic device, and a quantity of managed applications is limited. Therefore, in order that the voice assistant of the first electronic device can manage the application (for example, the first application) on another electronic device, before the first electronic device performs operation S503, the first electronic device may further add the first application to an application list managed by the voice assistant application (in some embodiments, may further add a managed electronic device, that is, the second electronic device).

In this case, the first electronic device may send the control request to the second electronic device after adding the first application to the list of the voice assistant application, so that the second electronic device feeds back the command information of the first application based on the control request. For a process, refer to the description of the manner 3 in operation S501. Details are not described herein again.

In addition, before sending command information of a corresponding application to another electronic device, the first electronic device may further determine whether another electronic device is turned on (whether a connection is established between the first electronic device and the other electronic device). If the other electronic device is not turned on, the first electronic device may further send a turn-on signal (for example, an infrared signal) to the other electronic device. The second electronic device is still used as an example. Before the first electronic device sends the command information of the first application to the second electronic device, the method further includes the following operations:

When it is determined that a connection to the second electronic device is not established, the first electronic device sends a turn-on signal to the second electronic device; and establishes the connection to the second electronic device after the second electronic device is turned on.

In this operation, the first electronic device may further automatically start another electronic device, and establish a connection to the other electronic device, thereby reducing operations of the user in a collaborative control process and improving user experience.

In addition, in this embodiment of this application, if the first electronic device obtains the command information of the first application and the information about the second electronic device in operation S501, and further obtains information about a fourth electronic device associated with the second electronic device (which indicates that cooperation of the fourth electronic device may be needed when the second electronic device implements the action of the first application), before sending the command information of the first application to the second electronic device, the first electronic device further needs to establish a connection to the fourth electronic device, that is, perform the following operations:

When it is determined that the connection to the fourth electronic device is not established, the first electronic device sends a turn-on signal to the fourth electronic device; and establishes the connection to the fourth electronic device after the fourth electronic device is turned on. In this way, the first electronic device may further control starting of the fourth electronic device associated with the second electronic device. Therefore, the connection can be automatically established between the fourth electronic device in an on state and the second electronic device in the on state, to ensure that the second electronic device can cooperate with the fourth electronic device to implement the action of the first application.

S504: The second electronic device starts the first application based on the received command information of the first application, and executes the action of the first application through the first application.

It should be further noted that in this embodiment of this application, after the first electronic device generates the control application, if the user further has an application control requirement or a multi-device collaboration requirement, the first electronic device may further send the command information of the control application to the fifth electronic device. The command information of the control application is used to start the control application. In this way, the fifth electronic device may generate a new control application on the fifth electronic device based on the command information of the control application. For a process in which the fifth electronic device generates the new control application, refer to the process in which the first electronic device generates the control application in the foregoing operations. Details are not described herein.

In addition, in this embodiment of this application, for execution actions inside each electronic device in a generation process and a start process of the control application, refer to the descriptions in FIG. 4A and FIG. 4B. Details are not described herein again.

An embodiment of this application provides a control method. According to the method, an electronic device may obtain command information of an application on another electronic device, and generate a control application based on the command information. In this way, a user can start the control application to enable another electronic device to implement an action of the application. Apparently, based on this method, the electronic device may implement a cross-device application control function through generating the control application, to implement multi-device collaboration and improve user experience.

The method provided in this embodiment of this application may be applied to various application scenarios. The following describes the control method provided in this embodiment of this application with reference to several instances. It should be noted that, for a generation process and a start process of the control application in the following instances, reference may be made to the descriptions in FIG. 4A and FIG. 4B and the descriptions in the embodiment shown in FIG. 5. Details are not described in the following instances again. In addition, in the following instances, a connection between any two electronic devices may be various wireless communication connections, for example, at least one of a local area network connection, a Wi-Fi connection, a Bluetooth connection, an IR connection, an NFC connection, and a sidelink connection.

Instance 1: An applicable application scenario is that the user uses the Huawei Video application on a smart television to watch a video, and the user expects to use a smartphone as a remote control.

In this instance, a process of generating a cross-device control application (which may also be referred to as an integration application) includes the following operations:

The user selects, as an application to be collaboratively controlled (to be shared or to be integrated), the Huawei Video application from an application list interface of the smart television; and selects a smartphone as an electronic device to be shared with. The smart television sends an icon and an intent of the Huawei Video application and an identifier of the smart television to the smartphone through a control request.

After receiving the control request, the smartphone asks the user whether to select a local application for collaborative control with the Huawei Video application (whether to select a local application to be integrated or combined with the Huawei Video application). If the user selects a local Smart Remote application for collaborative control with the Huawei Video application, the smartphone generates a control application based on the intent of the Huawei Video application and an intent of the Smart Remote application, and generates a control icon based on the icon of the Huawei Video application and an icon of the Smart Remote application; and associates the control icon with the control application, and associates the control icon with the identifier of the smart television.

In addition, with reference to FIG. 6A and FIG. 6B, a process of starting the control application in this instance includes the following operations:

The user taps the control icon of the control application on a home screen of the smartphone. The smartphone detects a connection to the smart television. If the smartphone does not detect the connection to the smart television, it indicates that the smart television is not turned on. In this case, the smartphone turns on the smart television through an infrared remote control signal, and establishes the connection to the smart television.

The smartphone starts the Smart Remote application according to a normal local application start process.

The smartphone sends the intent of the Huawei Video application to the smart television. Then, the smart television starts the Huawei Video application.

In this way, the user may perform various operations on the Smart Remote application on the smartphone, and the smartphone sends an infrared remote control signal corresponding to the operation to the smart television, so that the Huawei Video application on the smart television performs a corresponding action based on the infrared remote control signal.

In this instance, when the user does not need to operate a remote control of the smart television, through the operation of tapping the control icon on the smartphone, the user may turn on the smart television and respectively open corresponding applications on the smartphone and the smart television. Then, the user may use the smartphone as a remote control to operate the Smart Remote application on the smartphone, to directly control a program played by using the Huawei Video application on the smart television.

Apparently, in this instance, a function of a desktop icon on the smartphone is extended. In other words, an objective of starting a plurality of devices and opening a plurality of applications can be achieved through a single control icon. In addition, the control application on the smartphone is associated with the identifier of the smart television, so that the smartphone can automatically complete a process of turning on the smart television and establishing the connection to the smart television based on the identifier of the smart television.

Instance 2: A use application scenario is that the user plays games through a badminton motion sensing game application on the smart television, and the user expects that the smartphone can be used as a motion controller (that is, an input device for inputting other data).

In this instance, a process of generating a cross-device control application (which may also be referred to as an integration application) includes the following operations:

The user selects, as an application to be collaboratively controlled (to be shared or to be integrated), the badminton motion sensing game application from an application list interface of the smart television (that is, selects the badminton motion sensing game application as an application that needs to be associated with the input device); and selects the smartphone as an electronic device to be shared with. The smart television sends an icon and an intent of the badminton motion sensing game application and the identifier of the smart television to the smartphone through a control request.

After receiving the control request, the smartphone asks the user whether to select a local application for collaborative control with the badminton motion sensing game application (whether to select a local application to be integrated or combined with the badminton motion sensing game application). If the user selects a local motion control application for collaborative control with the badminton motion sensing game application, the smartphone generates a control application based on the intent of the badminton motion sensing game application and an intent of the motion control application, and generates a control icon based on the icon of the badminton motion sensing game application and an icon of the motion control application; and associates the control icon with the control application, and associates the control icon with the identifier of the smart television.

Figure 7A:
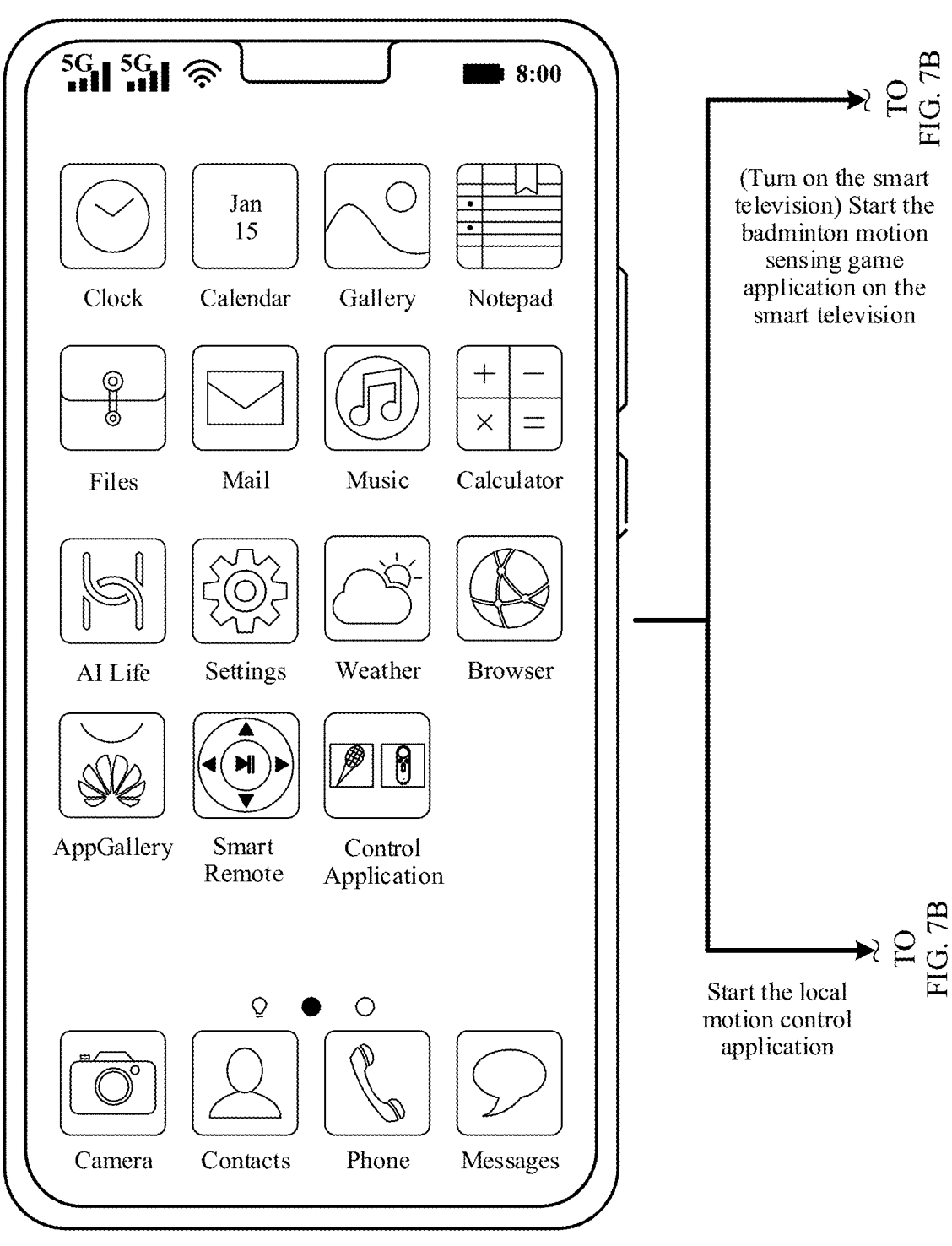
FIG. 7A and FIG. 7B are a schematic diagram of an instance of another control method according to an embodiment of this application.
Figure 7B:
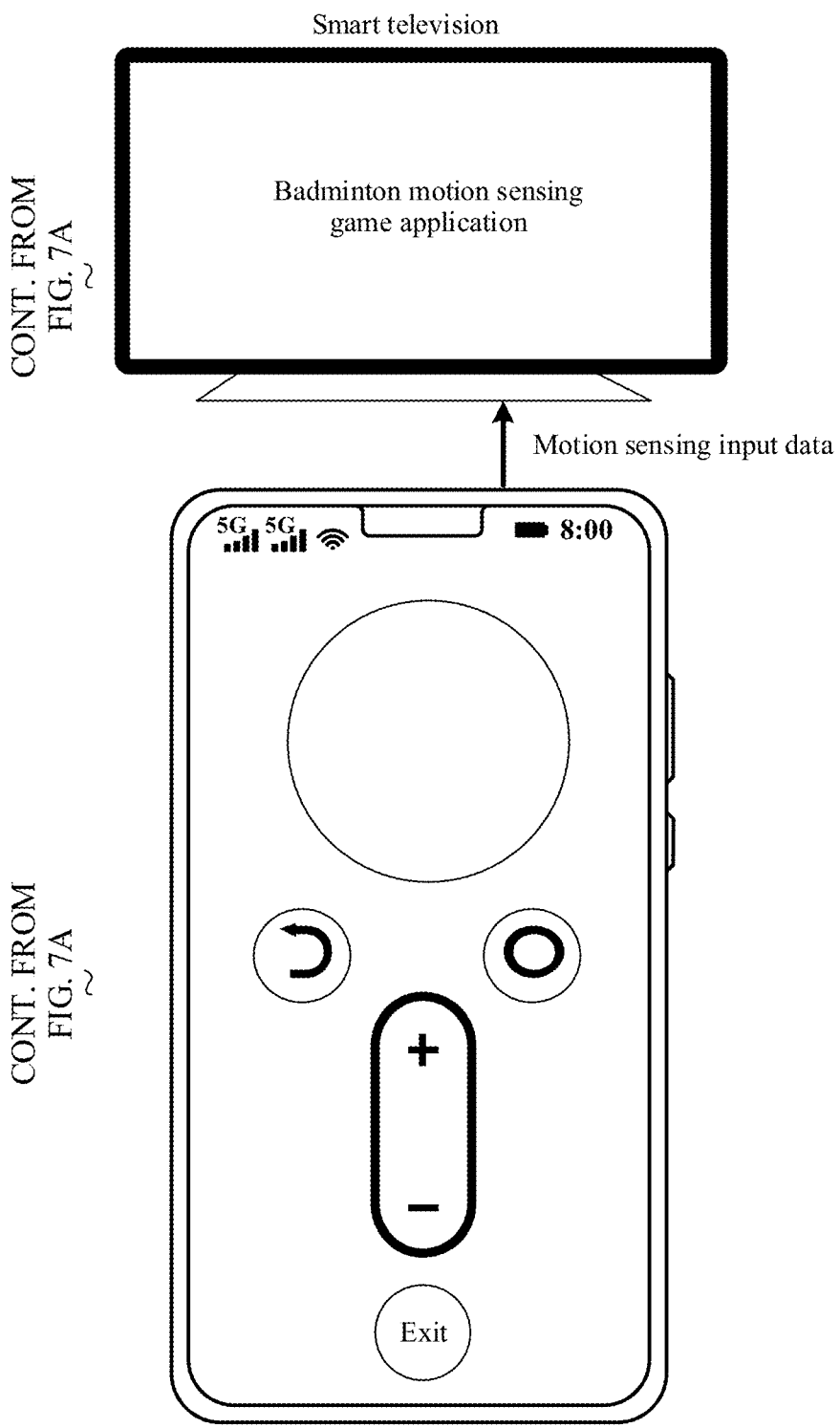

In addition, with reference to FIG. 7A and FIG. 7B, a process of starting the control application in this instance includes the following operations:

The user taps the control icon of the control application on a home screen of the smartphone. The smartphone detects a connection to the smart television. If the smartphone does not detect the connection to the smart television, it indicates that the smart television is not turned on. In this case, the smartphone turns on the smart television through an infrared remote control signal, and establishes the connection to the smart television.

The smartphone starts the motion control application according to a normal local application start process.

The smartphone sends the intent of the badminton motion sensing game application to the smart television. Then the smart television starts the badminton motion sensing game application.

In this way, the user may use the smartphone as a motion controller. As the user changes a location of the smartphone, the smartphone sends motion sensing input data to the smart television, so that the badminton motion sensing game application on the smart television may implement an action corresponding to the received motion sensing input data. The smartphone may transmit the motion sensing input data through the established connection (for example, a Bluetooth connection or a Wi-Fi connection) to the smart television, or the smartphone establishes a new connection to the smart television to transmit the motion sensing input data.

In this instance, when the user does not need a gamepad, through the operation of tapping the control icon on the smartphone, the user may turn on the smart television and open the badminton motion sensing game application on the smart television. Then, the user may use the smartphone as a motion controller or a gamepad to control a game object in the badminton motion sensing game application on the smartphone.

Apparently, in this instance, a function of a desktop icon on the smartphone is extended. In other words, an objective of starting a plurality of devices and opening a plurality of applications can be achieved through a single control icon. In addition, the control application on the smartphone is associated with the identifier of the smart television, so that the smartphone can automatically complete a process of turning on the smart television and establishing the connection to the smart television based on the identifier of the smart television.

Instance 3: An applicable application scenario is that the user uses the WeSing application on the smart television to sing, and the user expects to use the smartphone as a microphone and play audio through a smart speaker.

In this instance, a process of generating a cross-device control application (which may also be referred to as an integration application) includes the following operations:

The user selects, as an application to be collaboratively controlled (to be shared or to be integrated), the WeSing application from an application list interface of the smart television; and selects the smartphone as an electronic device to be shared with, and selects the smart speaker as an associated device. The smart television sends an icon and an intent of the WeSing application, the identifier of the smart television, and an identifier of the smart speaker to the smartphone through a control request.

After receiving the control request, the smartphone asks the user whether to select a local application for collaborative control with the WeSing application (whether to select a local application to be integrated or combined with the WeSing application). If the user selects a local microphone application for collaborative control with the WeSing application, the smartphone generates a control application based on the intent of the WeSing application and an intent of the microphone application, and generates a control icon based on the icon of the WeSing application and an icon of the microphone application; and associates the control icon with the control application, and associates the control icon with the identifier of the smart television and the identifier of the smart speaker.

Figures 8A, 8B, 8C:
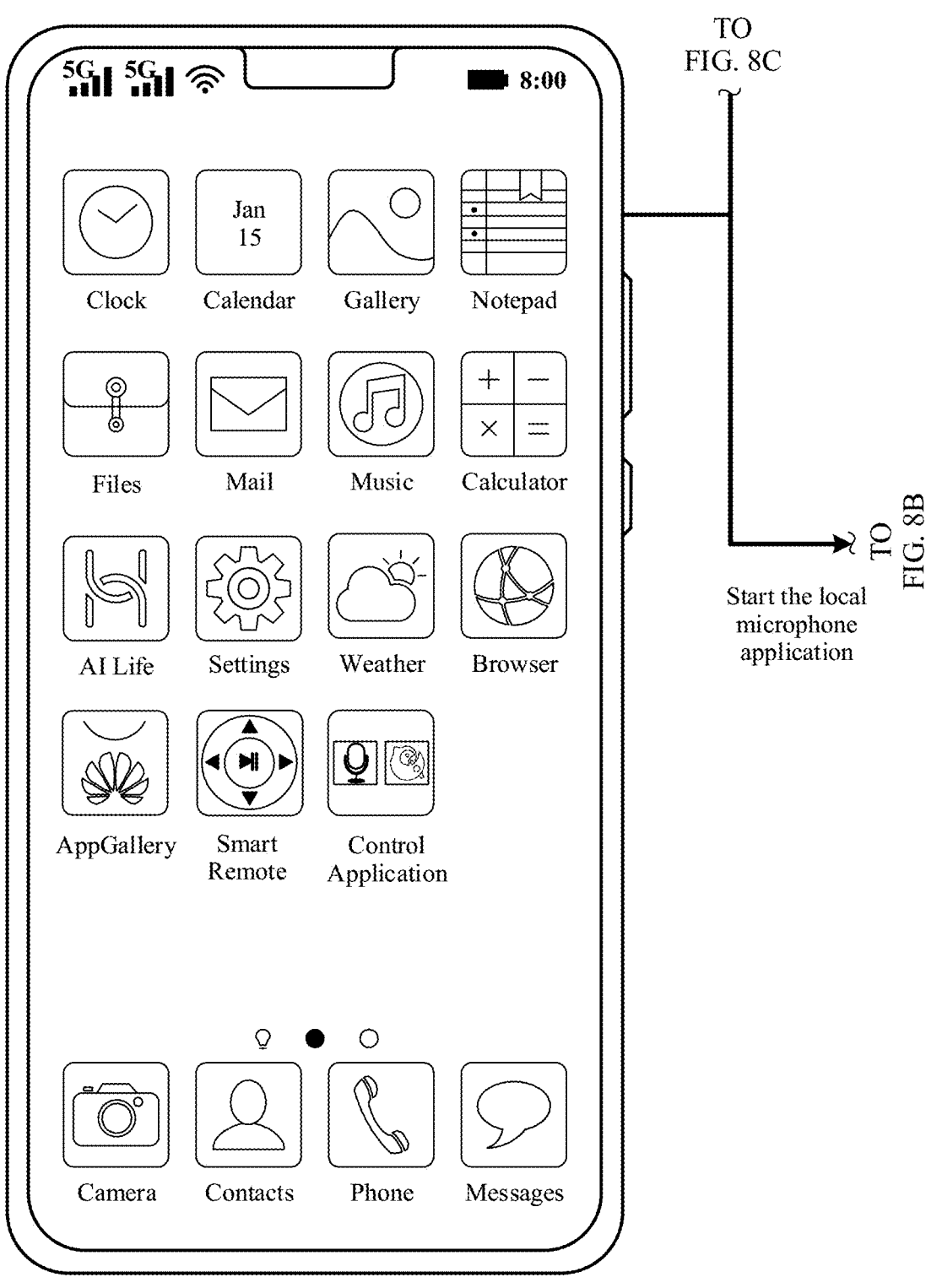
FIG. 8A, FIG. 8B, and FIG. 8C are a schematic diagram of an instance of still another control method according to an embodiment of this application.
Figure 8B:
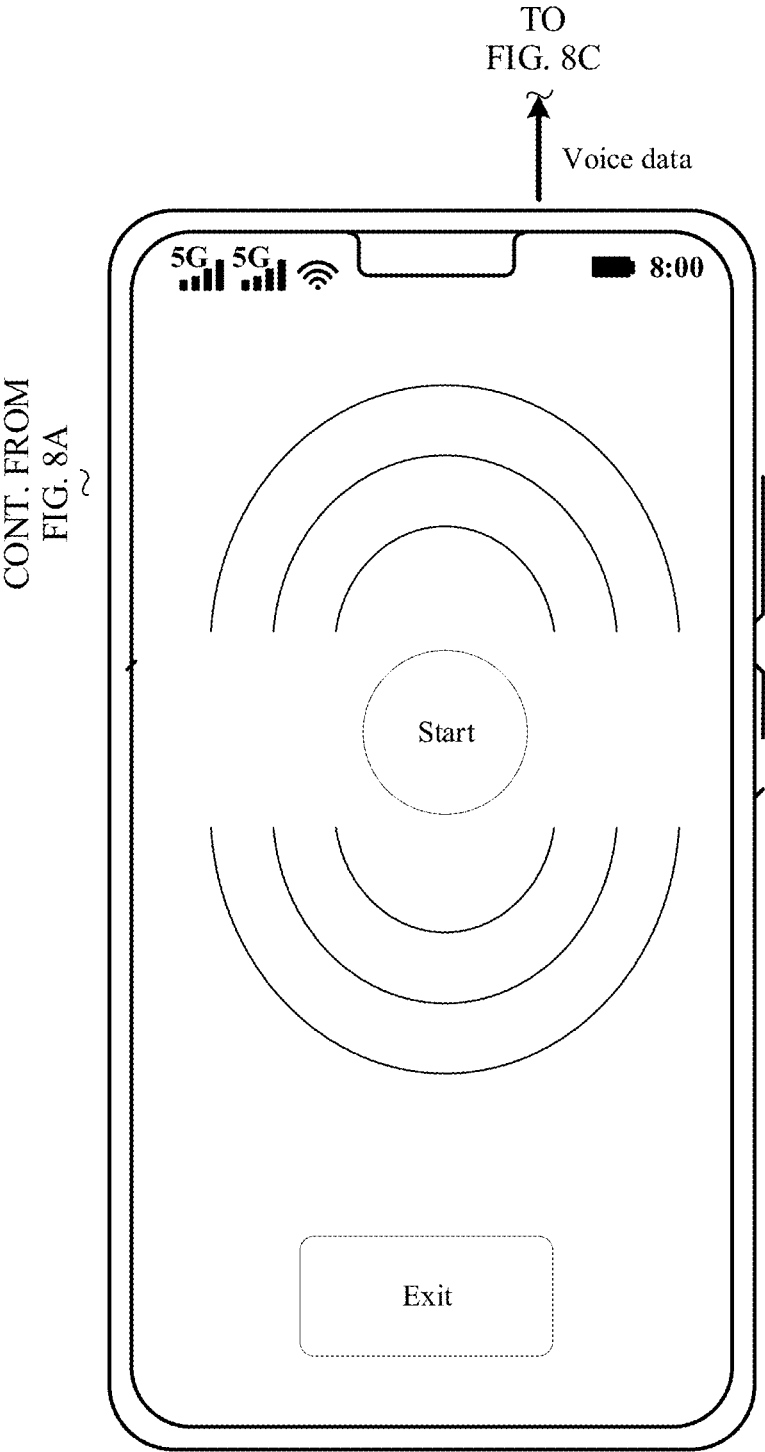
Figure 8C:
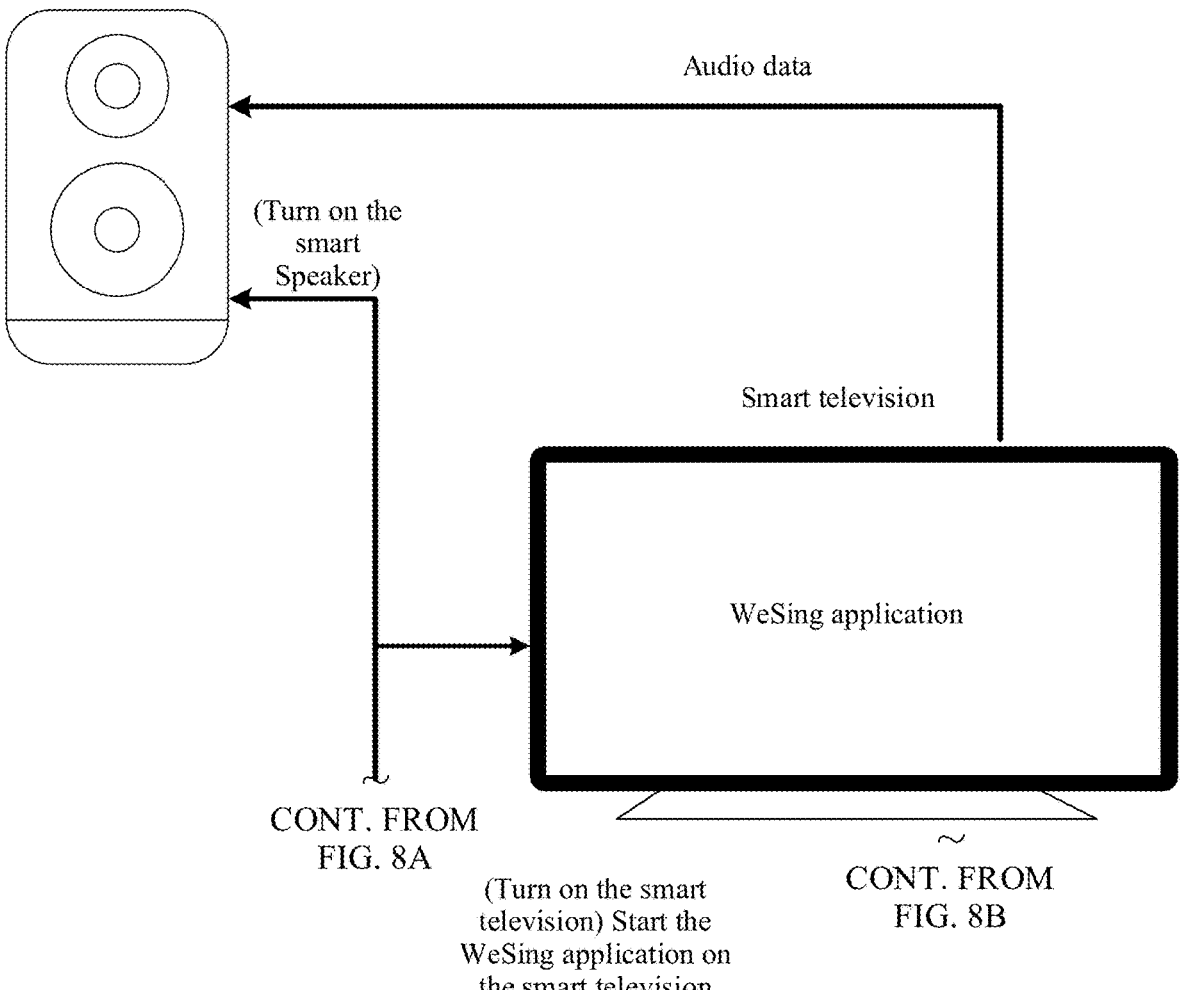

In addition, with reference to FIG. 8A, FIG. 8B, and FIG. 8C, a process of starting the control application in this instance includes the following operations:

The user taps the control icon of the control application on a home screen of the smartphone. The smartphone separately detects a connection to the smart television and a connection to the smart speaker. If the smartphone does not detect the connection to the smart television, it indicates that the smart television is not turned on. In this case, the smartphone turns on the smart television through an infrared remote control signal, and establishes the connection to the smart television. Similarly, if the smartphone does not detect the connection to the smart speaker, it indicates that the smart speaker is not turned on. In this case, the smartphone turns on the smart speaker through an infrared remote control signal, and establishes the connection to the smart speaker. In this way, when both the smart speaker and the smart television are turned on, a connection between the smart speaker and the smart television may be established.

The smartphone starts the microphone application according to a normal local application start process.

The smartphone sends the intent of the WeSing application to the smart television. Then, the smart television starts the WeSing application.

In this way, through the microphone application on the smartphone, the user may use the smartphone as a microphone of the smart television to collect voice data of the user, and the smartphone sends the voice data to the smart television, so that the WeSing application on the smart television processes the voice data and further generates audio data. The smart television may further send the audio data to the smart speaker, so that the smart speaker outputs the audio data.

The smartphone may transmit the intent or the voice data of the WeSing application to the smart television through the connection (for example, a Bluetooth connection) to the smart television, and the smart television may also transmit the audio data to the smart speaker through the connection (for example, a Bluetooth connection) to the smart speaker.

In this instance, when the user does not need to operate the remote control of the smart television, through the operation of tapping the control icon on the smartphone, the user may turn on the smart television and the smart speaker and respectively open the corresponding applications on the smartphone and the smart television. Then, the user may use the smartphone as the microphone of the smart television to collect the voice data. In addition, the smart television may further play the audio data through the smart speaker, thereby significantly improving user experience.

Apparently, in this instance, a function of a desktop icon on the smartphone is extended. In other words, an objective of starting a plurality of devices and opening a plurality of applications can be achieved through a single control icon. In addition, the control application on the smartphone is associated with the identifier of the smart television and the identifier of the smart speaker, so that the smartphone can automatically complete a process of turning on the smart television and establishing the connection to the smart television based on the identifier of the smart television, and automatically complete turning on the smart speaker based on the identifier of the smart speaker.

Instance 4: An applicable application scenario is that the user expects to use the voice assistant application on the smartphone to collaboratively control the Huawei Video application on the smart television, and use the smart speaker to play audio.

In this instance, the process in which the smartphone generates the cross-device control application includes the following operations:

The user adds the smart television (that is, the smart television is an electronic device to be collaboratively controlled) to an electronic device list managed by the voice assistant application on the smartphone. The smartphone sends a control request to the smart television.

After receiving the control request, the smart television prompts the user to select an application to be collaboratively controlled. Then, the user operates the smart television, selects the local Huawei Video application as an application to be collaboratively controlled, and selects the smart speaker as a device associated with the application. The smart television sends the icon and the intent of the Huawei Video application, the identifier of the smart television, and the identifier of the smart speaker to the smartphone through a control response.

After receiving the control request, the smartphone generates a control application based on the intent of the Huawei Video application, and generates a control icon based on the icon of the Huawei Video application; and associates the generated control icon with the generated control application, and associates the control icon with the identifier of the smart television and the identifier of the smart speaker.

Figures 9A, 9B:
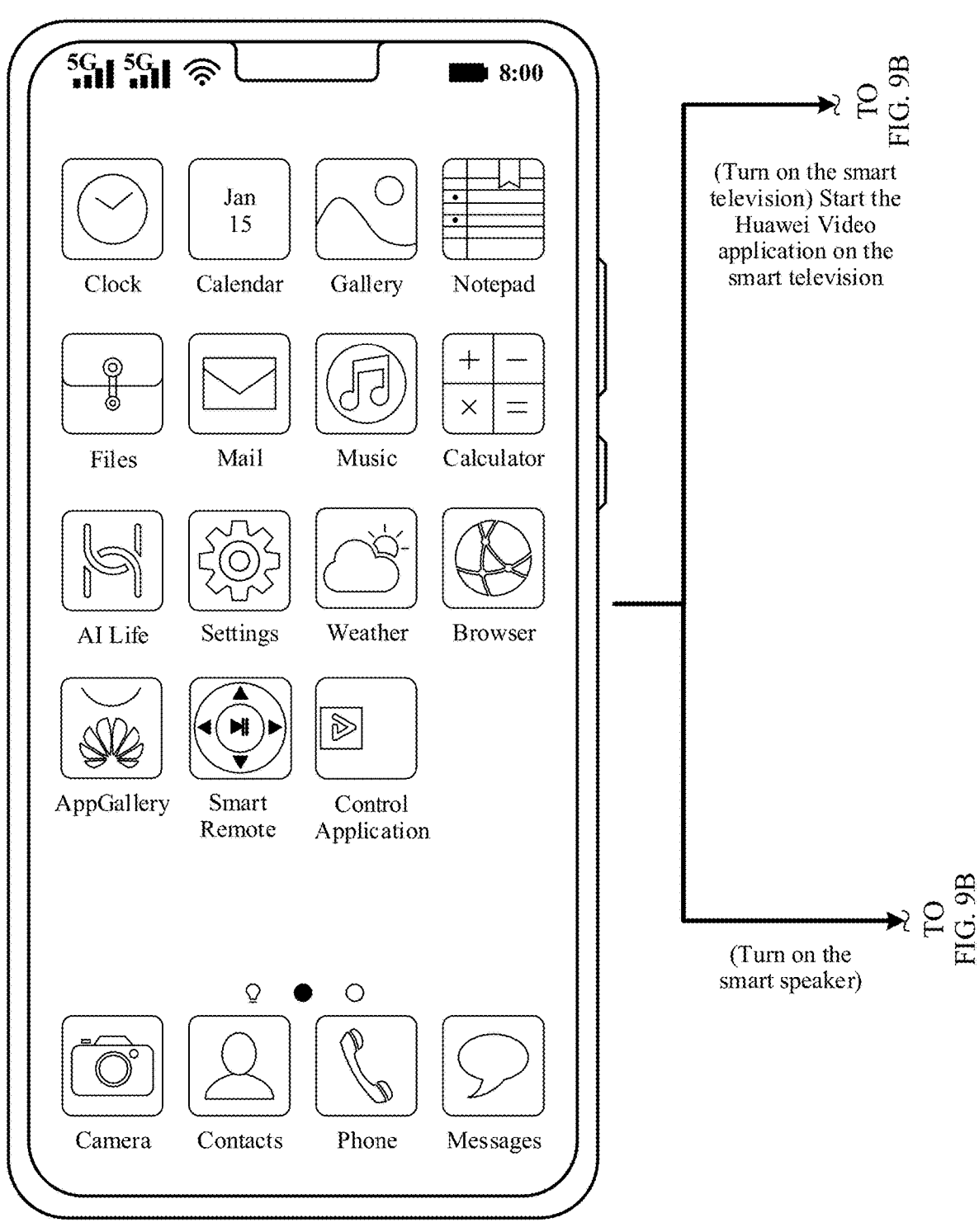
FIG. 9A and FIG. 9B are a schematic diagram of an instance of yet another control method according to an embodiment of this application.
Figure 9B:
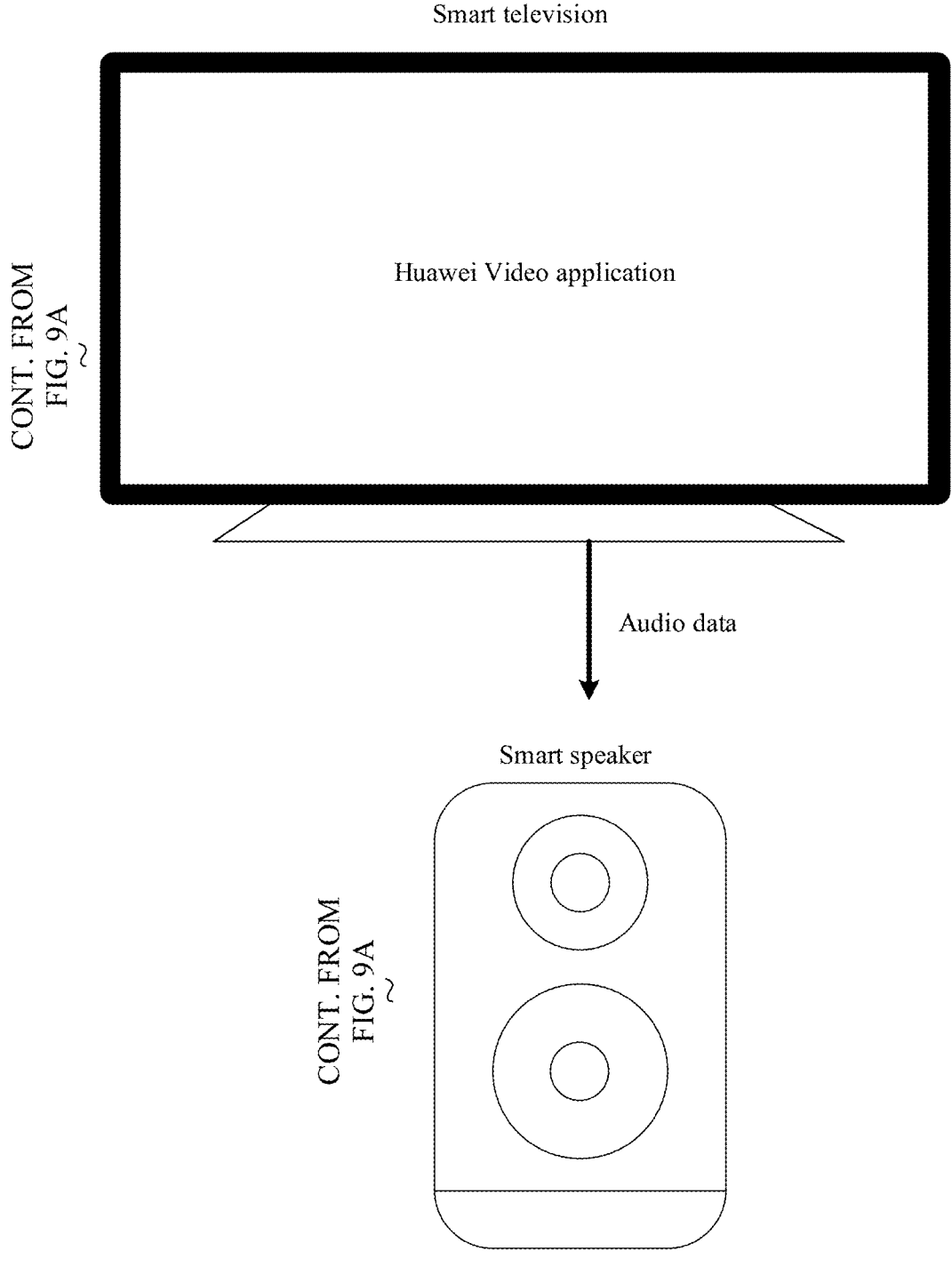

In addition, with reference to FIG. 9A and FIG. 9B, a process of starting the control application (including the second control application in some embodiments) on the smartphone in this instance includes the following operations:

The user starts the voice assistant application on the smartphone, and inputs voice information "Play XXXX on a television". The voice assistant application parses the voice information, starts the control application on the smartphone, and generates a command message indicating to play XXXX. The smartphone separately detects a connection to the smart television and a connection to the smart speaker. If the smartphone does not detect the connection to the smart television, it indicates that the smart television is not turned on. In this case, the smartphone turns on the smart television through an infrared remote control signal, and establishes the connection to the smart television. Similarly, if the smartphone does not detect the connection to the smart speaker, it indicates that the smart speaker is not turned on. In this case, the smartphone turns on the smart speaker through an infrared remote control signal, and establishes the connection to the smart speaker. In this way, when both the smart speaker and the smart television are turned on, a connection between the smart speaker and the smart television may be established.

After establishing the connection to the smart television, the smartphone sends, to the smart television, the intent of the Huawei Video application and the command message obtained through parsing the voice information. Then, the smart television starts the Huawei Video application, and plays the XXXX video according to the command message. In addition, the smart television sends audio data of the XXXX video to the smart speaker, so that the smart speaker outputs the audio data. The smart television may transmit the audio data to the smart speaker through the connection (for example, a Bluetooth connection) to the smart speaker.

Instance 5: An applicable application scenario is the same as that in the instance 4.

It should be noted that a prerequisite of this instance is that the smart television generates a first control application for the user. The first control application is generated based on the intent of the Huawei Video application, and is associated with the smart speaker. A generation process is as follows: The user selects, as an application to be collaboratively controlled, the Huawei Video application from an application list interface of the smart television; and selects the smart speaker as an electronic device to be associated with. The smart television generates the first control application based on the intent of the Huawei Video application, and generates a first control icon based on the icon of the Huawei Video application; and associates the first control icon with the first control application, and associates the first control icon with the identifier of the smart speaker.

In this instance, the process in which the smartphone generates the cross-device control application includes the following operations:

The user adds the smart television (that is, the smart television is an electronic device to be collaboratively controlled) to an electronic device list managed by the voice assistant application on the smartphone. The smartphone sends a control request to the smart television.

After receiving the control request, the smart television prompts the user to select an application to be collaboratively controlled. Then, the user operates the smart television, and selects the local first control application as the application to be collaboratively controlled. The smart television sends the icon and an intent of the first control application (used to open the Huawei Video application and perform playing through the smart speaker), the identifier of the smart television, and the identifier of the smart speaker to the smartphone through a control response.

After receiving the control request, the smartphone generates a second control application based on the intent of the first control application, and generates a second control icon based on the icon of the first control application; and associates the generated second control icon with the second control application, and associates the second control icon with the identifier of the smart television and the identifier of the smart speaker.

In addition, with reference to FIG. 9A and FIG. 9B, a process of starting the second control application on the smartphone in this instance includes the following operations:

The user starts the voice assistant application on the smartphone, and inputs voice information "Play XXXX on a television". The voice assistant application parses the voice information, starts the second control application on the smartphone, and generates a command message indicating to play XXXX. The smartphone separately detects a connection to the smart television and a connection to the smart speaker. If the smartphone does not detect the connection to the smart television, it indicates that the smart television is not turned on. In this case, the smartphone turns on the smart television through an infrared remote control signal, and establishes the connection to the smart television. Similarly, if the smartphone does not detect the connection to the smart speaker, it indicates that the smart speaker is not turned on. In this case, the smartphone turns on the smart speaker through an infrared remote control signal, and establishes the connection to the smart speaker. In this way, when both the smart speaker and the smart television are turned on, a connection between the smart speaker and the smart television may be established.

After establishing the connection to the smart television, the smartphone sends, to the smart television, the intent of the first control application and the command message obtained through parsing the voice information. Then, the smart television starts the first control application (including opening the local Huawei Video application and establishing the connection to the smart speaker), and plays the XXXX video in the Huawei Video application according to the command message. In addition, the smart television sends audio data of the XXXX video to the smart speaker, so that the smart speaker outputs the audio data.

In the instance 4 and the instance 5, the user may manage an application on another electronic device through the voice assistant application, thereby greatly expanding an application scope of the voice assistant application. In addition, through the voice assistant application, all applications and all electronic devices for meeting a requirement of the user can be started at a time. As shown in the foregoing instances, the user can directly operate the voice assistant application on the smartphone side, that is, turn on the smart television and the smart speaker at a time, and open the Huawei Video application on the smart television to play a desired video.

Apparently, the instance 4 and the instance 5 extend functions of the voice assistant application, so that the voice assistant application can further manage another electronic device. In addition, in a process of managing another electronic device, the voice assistant application can start a corresponding device through starting the control application, without based on an on state of the other electronic device or an open state of the voice assistant.

Figure 10:
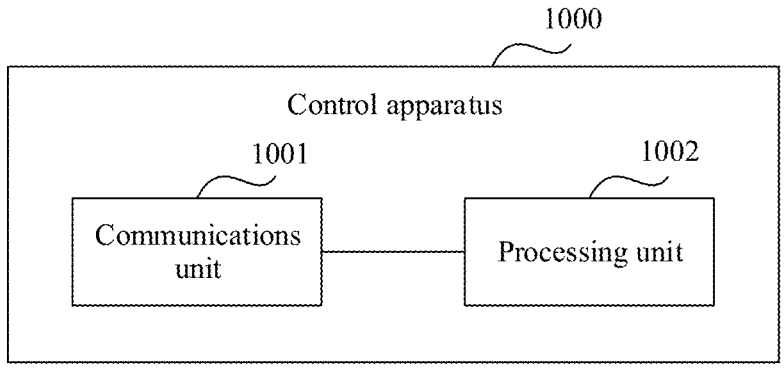
FIG. 10 is a diagram of a structure of a control apparatus according to an embodiment of this application.

Based on the foregoing embodiments and instances, this application further provides a control apparatus. The apparatus can be used in the electronic device in the foregoing embodiments or instances. The following example is used for description below: The apparatus is used in a first electronic device. The apparatus can implement the foregoing control method. With reference to FIG. 10, a control apparatus 1000 includes a communications unit 1001 and a processing unit 1002. The following describes functions of each unit.

The communications unit 1001 is configured to receive and send data. For example, the communications unit 1001 may be implemented through a mobile communications module and/or a wireless communications module.

The processing unit 1002 is configured to: obtain command information of a first application, where the first application is on a second electronic device, and the command information of the first application is used to implement an action of the first application; and generate a control application based on the command information of the first application, where the control application is used to enable the second electronic device to implement the action of the first application.

In some embodiments, when obtaining the command information of the first application, the processing unit 1002 is configured to:

receive the command information of the first application from the second electronic device through the communications unit 1001; or obtain the command information that is of the first application and that is input by a user.

In some embodiments, the processing unit 1002 is further configured to:

generate a control icon corresponding to the control application; and display the control icon on a display of the first electronic device.

In some embodiments, when generating the control icon corresponding to the control application, the processing unit 1002 is configured to:

obtain icon information corresponding to the first application; and generate the control icon based on the icon information corresponding to the first application.

In some embodiments, the processing unit 1002 is further configured to:

obtain a start command of the control application, and then send the command information of the first application to the second electronic device through the communications unit 1001, so that the second electronic device executes the action of the first application based on the received command information of the first application.

In some embodiments, when generating the control application based on the command information of the first application, the processing unit 1002 is configured to:

obtain command information of a second application, where the second application is on the first electronic device and/or a third electronic device, and the command information of the second application is used to implement an action of the second application; and generate the control application based on the command information of the first application and the command information of the second application, where the control application is further used to enable the first electronic device and/or the third electronic device to implement the action of the second application.

When the second application is on the first electronic device, the processing unit 1002 is further configured to: obtain the start command of the control application, and then execute the action of the second application based on the command information of the second application.

When the second application is on the third electronic device, the processing unit 1002 is further configured to: obtain the start command of the control application, and then send the command information of the second application to the third electronic device through the communications unit 1001, so that the third electronic device executes the action of the second application based on the received command information of the second application.

In some embodiments, the processing unit 1002 is configured to obtain the start command of the control application in the following manners:

Manner 1: Detect an operation performed by the user on the control icon corresponding to the control application, and generate the start command of the control application in response to the operation.

Manner 2: Receive a voice instruction of the user through a voice assistant application, and obtain the start command that is of the control application and that is obtained after the voice assistant application parses the voice instruction.

In some embodiments, the processing unit 1002 is further configured to:

before obtaining the start command that is of the control application and that is obtained after the voice assistant application parses the voice instruction, add the first application to an application list managed by the voice assistant application.

In some embodiments, the processing unit 1002 is further configured to obtain information about the second electronic device.

When sending the command information of the first application to the second electronic device through the communications unit 1001, the processing unit 1002 is configured to:

send the command information of the first application to the second electronic device through the communications unit 1001 based on the information about the second electronic device.

In some embodiments, the processing unit 1002 is further configured to:

before sending the command information of the first application to the second electronic device, when it is determined that a connection to the second electronic device is not established, send a turn-on signal to the second electronic device through the communications unit 1001; and establish the connection to the second electronic device.

In some embodiments, the processing unit 1002 is further configured to:

obtain information about a fourth electronic device associated with the second electronic device;

before sending the command information of the first application to the second electronic device, when it is determined that a connection to the fourth electronic device is not established, send a turn-on signal to the fourth electronic device through the communications unit 1001; and establish the connection to the fourth electronic device.

In some embodiments, the processing unit 1002 is further configured to: before obtaining the command information of the first application, send a first control request to the second electronic device through the communications unit 1001, so that the second electronic device feeds back the command information of the first application based on the first control request; or when obtaining the command information of the first application, the processing unit 1002 is configured to receive a second control request from the second electronic device through the communications unit 1001, where the second control request includes the command information of the first application.

In some embodiments, the processing unit 1002 is further configured to:

after the control application is generated, send the command information of the control application to a fifth electronic device through the communications unit 1001, where the command information of the control application is used to start the control application.

It should be noted that in the embodiments of this application, division into modules is an example, and is only a logical function division. In some embodiments, there may be another division manner. In addition, functional units in the embodiments of this application may be integrated into one processing unit, or may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technologies, or all or some of the technical solutions may be implemented in the form of a software product. The software product is stored in a storage medium and includes several instructions for instructing a computer device (which may be a personal computer, a server, or a network device) or a processor to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

Figure 11:
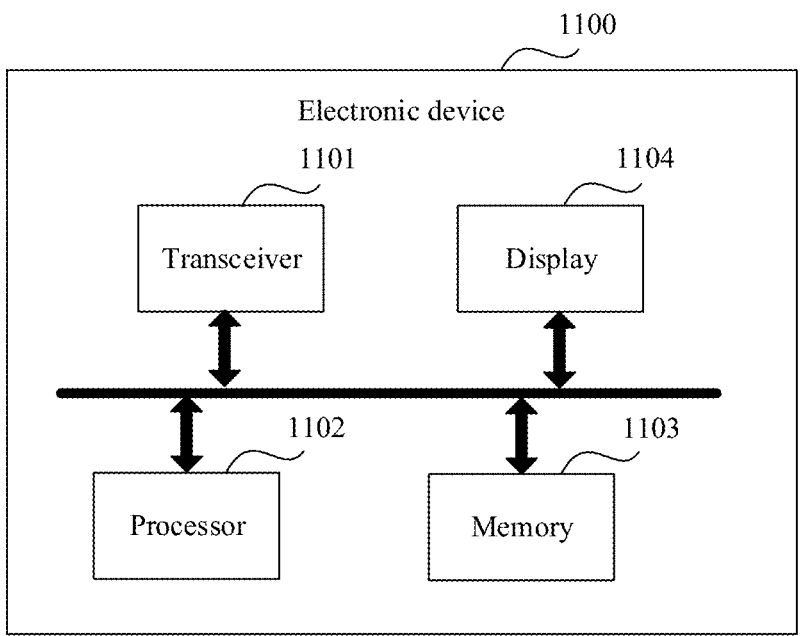
FIG. 11 is a diagram of a structure of an electronic device according to an embodiment of this application.

Based on the foregoing embodiments and instances, an embodiment of this application further provides an electronic device. The electronic device is configured to implement the control method provided in the foregoing embodiments, and has the functions of the control apparatus 1000 shown in FIG. 10. As shown in FIG. 11, the electronic device 1100 includes a transceiver 1101, a processor 1102, a memory 1103, and a display 1104.

The transceiver 1101, the processor 1102, the memory 1103, and the display 1104 are connected to each other. In some embodiments, the transceiver 1101, the processor 1102, the memory 1103, and the display 1104 are connected to each other through a bus. The bus may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus.

The transceiver 1101 is configured to receive and send data, to implement communication with another device. For example, the communications unit 1001 may be implemented through a mobile communications module and/or a wireless communications module. In some embodiments, the transceiver 1101 may be implemented through a radio frequency apparatus and an antenna.

The processor 1102 is configured to implement the control method provided in the foregoing embodiments or instances. For a process, refer to the description in the foregoing embodiments or instances. Details are not described herein again.

The display 1104 is configured to display an interface.

The processor 1102 may be a central processing unit (CPU), a network processor (NP), a combination of a CPU and an NP, or the like. The processor 1102 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof. The processor 1102 may implement the foregoing functions through hardware, or certainly, through executing corresponding software by hardware.

The memory 1103 is configured to store program instructions, and the like. In some embodiments, the program instructions may include program code. The program code includes computer operation instructions. The memory 1103 may include a random access memory (RAM), or may further include a non-volatile memory, such as at least one disk memory. The processor 1102 executes the program instructions stored in the memory 1103, to implement the foregoing functions, thereby implementing the method provided in the foregoing embodiments.

Based on the foregoing embodiments, an embodiment of this application further provides a computer program. When the computer program is run on a computer, the computer is enabled to perform the method provided in the foregoing embodiments.

Based on the foregoing embodiments, an embodiment of this application further provides a computer-readable storage medium. The computer-readable storage medium stores a computer program. When the computer program is executed by a computer, the computer is enabled to perform the method provided in the foregoing embodiments.

The storage medium may be any available medium that can be accessed by the computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer.

Based on the foregoing embodiments, an embodiment of this application further provides a chip. The chip is configured to read a computer program stored in a memory, to implement the method provided in the foregoing embodiments.

Based on the foregoing embodiments, an embodiment of this application provides a chip system. The chip system includes a processor, configured to support a computer apparatus in implementing related functions of the communications device in the foregoing embodiments. In some embodiments, the chip system further includes a memory. The memory is configured to store a program and data for the computer apparatus. The chip system may include a chip, or may include a chip and another discrete component.

In conclusion, the embodiments of this application provide a control method and apparatus, and an electronic device. Based on this solution, an electronic device may obtain command information of an application on another electronic device, and generate a control application based on the command information. In this way, a user can start the control application to enable another electronic device to implement an action of the application. Apparently, based on this method, the electronic device may implement a cross-device application control function through generating the control application, to implement multi-device collaboration and improve user experience.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to work, so that the instructions stored in the computer-readable memory generate an artifact that includes an instruction apparatus. The instruction apparatus implements a function in one or more processes in the flowcharts and/or in one or more blocks in the block diagrams.

The computer program instructions may be alternatively loaded onto a computer or another programmable data processing device, so that a series of operations and steps are performed on the computer or another programmable device, so that computer-implemented processing is generated. Therefore, the instructions executed on the computer or the other programmable device provide operations for implementing a function in one or more processes in the flowcharts and/or in one or more blocks in the block diagrams.

It is clearly that a person skilled in the art can make various modifications and variations to this application without departing from the scope of this application. In this way, this application is intended to cover these modifications and variations of this application provided that they fall within the scope of protection defined by the following claims and their equivalent technologies.

What is claimed is:

1. A control method, applied to a first electronic device, comprising:

obtaining, at the first electronic device from a second electronic device, command information of a first application, wherein the first application is on the second electronic device, and the command information of the first application is an intent comprising an abstract description of an action of the first application;

responsive to obtaining the command information, prompting a user of the first electronic device to select whether to perform collaborative control with a local second application on the first electronic device;

if the user selects not to perform collaborative control, generating, by a desktop management function of the first electronic device, a control application based on only the command information of the first application, wherein the control application is used to enable the second electronic device to implement the action of the first application; and if the user selects to perform collaborative control with the local second application, obtaining command information of the local second application and generating, by the desktop management function, the control application based on the command information of the first application and the command information of the local second application.

2. The method according to claim 1, wherein the method further comprises:

generating a control icon that is configured to start the control application when the control icon is selected; and displaying the control icon on a display.

3. The method according to claim 2, wherein the generating the control icon corresponding to the control application comprises:

obtaining icon information corresponding to the first application; and generating the control icon based on the icon information corresponding to the first application.

4. The method according to claim 1, wherein the method further comprises:

obtaining a start command of the control application; and sending the command information of the first application to the second electronic device so that the second electronic device executes the action of the first application based on the command information of the first application.

5. The method according to claim 4, wherein the generating the control application further comprises:

obtaining the command information of a second application, wherein the second application is on the first electronic device and/or a third electronic device, and the command information of the second application is used to implement an action of the second application; and generating the control application based on the command information of the first application and the command information of the second application, wherein the control application is further used to enable the first electronic device and/or the third electronic device to implement the action of the second application; and when the second application is on the first electronic device, after the obtaining the start command of the control application, the method further comprises: executing the action of the second application based on the command information of the second application.

6. The method according to claim 4, wherein the generating the control application based on the command information of the first application comprises:

obtaining the command information of a second application, wherein the second application is on the first electronic device and/or a third electronic device, and the command information of the second application is used to implement an action of the second application; and generating the control application based on the command information of the first application and the command information of the second application, wherein the control application is further used to enable the first electronic device and/or the third electronic device to implement the action of the second application; and when the second application is on the third electronic device, after the obtaining the start command of the control application, the method further comprises: sending the command information of the second application to the third electronic device, so that the third electronic device executes the action of the second application based on the command information of the second application.

7. The method according to claim 4, wherein the obtaining the start command of the control application comprises:

detecting an operation performed by the user on a control icon corresponding to the control application, and generating the start command of the control application in response to the operation.

8. The method according to claim 4, wherein the obtaining the start command of the control application comprises:

receiving a voice instruction of the user through a voice assistant application, and obtaining the start command that is of the control application and that is obtained after the voice assistant application parses the voice instruction.

9. The method according to claim 8, wherein before the obtaining the start command that is of the control application and that is obtained after the voice assistant application parses the voice instruction, the method further comprises:

adding the first application to an application list managed by the voice assistant application.

10. The method according to claim 4, wherein the method further comprises:

obtaining information about the second electronic device; and the sending the command information of the first application to the second electronic device comprises:

sending the command information of the first application to the second electronic device based on the information about the second electronic device.

11. The method according to claim 4, wherein before the sending the command information of the first application to the second electronic device, the method further comprises:

when it is determined that a connection to the second electronic device is not established, sending a turn-on signal to the second electronic device; and establishing the connection to the second electronic device.

12. The method according to claim 4, wherein the method further comprises:

obtaining information about a fourth electronic device associated with the second electronic device; and before the sending the command information of the first application to the second electronic device, the method further comprises:

when it is determined that a connection to the fourth electronic device is not established, sending a turn-on signal to the fourth electronic device; and establishing the connection to the fourth electronic device.

13. The method according to claim 1, wherein before the obtaining the command information of the first application, the method further comprises: sending a first control request to the second electronic device, so that the second electronic device feeds back the command information of the first application based on the first control request.

14. The method according to claim 1, wherein the obtaining the command information of the first application comprises: receiving a second control request from the second electronic device, wherein the second control request comprises the command information of the first application.

15. The method according to claim 1, wherein after the generating the control application, the method further comprises:

sending the command information of the control application to a fifth electronic device, wherein the command information of the control application is used to start the control application.

16. An electronic device, comprising:

a non-transitory computer readable medium which contains computer-executable instructions; and a processor configured to execute the computer-executable instructions to enable the electronic device to:

obtain, at the electronic device from a second electronic device, command information of a first application, wherein the first application is on the second electronic device, and the command information of the first application is an intent comprising an abstract description of an action of the first application;

responsive to obtaining the command information, prompt a user of the electronic device to select whether to perform collaborative control with a local second application on the electronic device;

if the user selects not to perform collaborative control, generate, by a desktop management function of the electronic device, a control application based only on the command information of the first application, wherein the control application is used to enable the second electronic device to implement the action of the first application; and if the user selects to perform collaborative control with the local second application, obtain command information of the local second application and generate, by the desktop management function, the control application based on the command information of the first application and the command information of the local second application.

17. The electronic device according to claim 16, wherein the electronic device is further configured to:

generate a control icon that is configured to start the control application when the control icon is selected; and display the control icon on a display.

18. The electronic device according to claim 17, wherein the electronic device is further configured to:

obtain icon information corresponding to the first application; and generate the control icon based on the icon information corresponding to the first application.

19. The electronic device according to claim 16, wherein the electronic device is further configured to:

obtain a start command of the control application; and send the command information of the first application to the second electronic device so that the second electronic device executes the action of the first application based on the command information of the first application.

20. A non-transitory computer storage medium, wherein the computer storage medium stores a computer program, and when the computer program is executed by a computer, the computer is enabled to:

obtain, at a first electronic device from a second electronic device, command information of a first application, wherein the first application is on the second electronic device, and the command information of the first application is an intent comprising an abstract description of an action of the first application;

responsive to obtaining the command information, prompt a user of the first electronic device to select whether to perform collaborative control with a local second application on the first electronic device;

if the user selects not to perform collaborative control, generate, by a desktop management function of the first electronic device, a control application based only on the command information of the first application, wherein the control application is used to enable the second electronic device to implement the action of the first application; and if the user selects to perform collaborative control with the local second application, obtain command information of the local second application and generate, by the desktop management function, the control application based on the command information of the first application and the command information of the local second application.

* * * * *